United States Patent
Magsamen, Jr. et al.

(10) Patent No.: US 8,139,751 B1
(45) Date of Patent: *Mar. 20, 2012

(54) SYSTEM AND METHOD TO COMMUNICATE INFORMATION TO AN EMPLOYEE

(75) Inventors: Leonard J. Magsamen, Jr., Fair Oaks Ranch, TX (US); Polly Hillert, Boerne, TX (US); Brittney Chiu, San Antonio, TX (US); Dawn Snow, San Antonio, TX (US)

(73) Assignee: United States Automobile Association (USAA), San Antonio, TX (US)

( * ) Notice: Subject to any disclaimer, the term of this patent is extended or adjusted under 35 U.S.C. 154(b) by 1154 days.

This patent is subject to a terminal disclaimer.

(21) Appl. No.: 11/867,312

(22) Filed: Oct. 4, 2007

(51) Int. Cl.
*H04M 3/00* (2006.01)
*H04M 5/00* (2006.01)

(52) U.S. Cl. .................. 379/265.01; 379/309; 709/207; 709/200

(58) Field of Classification Search .............. 379/265.01, 379/309; 709/207, 200; 705/9
See application file for complete search history.

(56) References Cited

U.S. PATENT DOCUMENTS

| | | | |
|---|---|---|---|
| 5,229,691 A | 7/1993 | Shichao et al. | |
| 5,907,275 A | 5/1999 | Battistini et al. | |
| 6,191,825 B1 | 2/2001 | Sprogis et al. | |
| 6,430,603 B2 | 8/2002 | Hunter | |
| 6,430,605 B2 | 8/2002 | Hunter | |
| 6,453,021 B1 * | 9/2002 | Ripley et al. | 379/88.11 |
| 6,782,415 B1 * | 8/2004 | Quine | 709/206 |
| 2002/0010519 A1 | 1/2002 | Watanabe et al. | |
| 2003/0006911 A1 | 1/2003 | Smith et al. | |
| 2004/0267592 A1 | 12/2004 | Ogushi et al. | |
| 2005/0143097 A1 | 6/2005 | Wilson et al. | |
| 2007/0073589 A1 * | 3/2007 | Vergeyle et al. | 705/14 |
| 2008/0032703 A1 | 2/2008 | Krumm et al. | |
| 2008/0052151 A1 | 2/2008 | Xie et al. | |
| 2008/0162037 A1 | 7/2008 | Hasan Mahmoud | |
| 2008/0171559 A1 | 7/2008 | Frank et al. | |
| 2008/0172292 A1 | 7/2008 | Hurowitz et al. | |
| 2008/0318559 A1 | 12/2008 | Porco | |

* cited by examiner

*Primary Examiner* — Quynh Nguyen
(74) *Attorney, Agent, or Firm* — Brooks, Cameron & Huebsch, PLLC

(57) ABSTRACT

Disclosed are systems and methods to communicate information to an employee using an electronic display area. The electronic display area may include a variety of placements in an employment area, a call center, and/or a mobile device. An employer may communicate information to the employee through any or all the display areas based on attributes of the display placement, the employee, and the employee location.

21 Claims, 20 Drawing Sheets

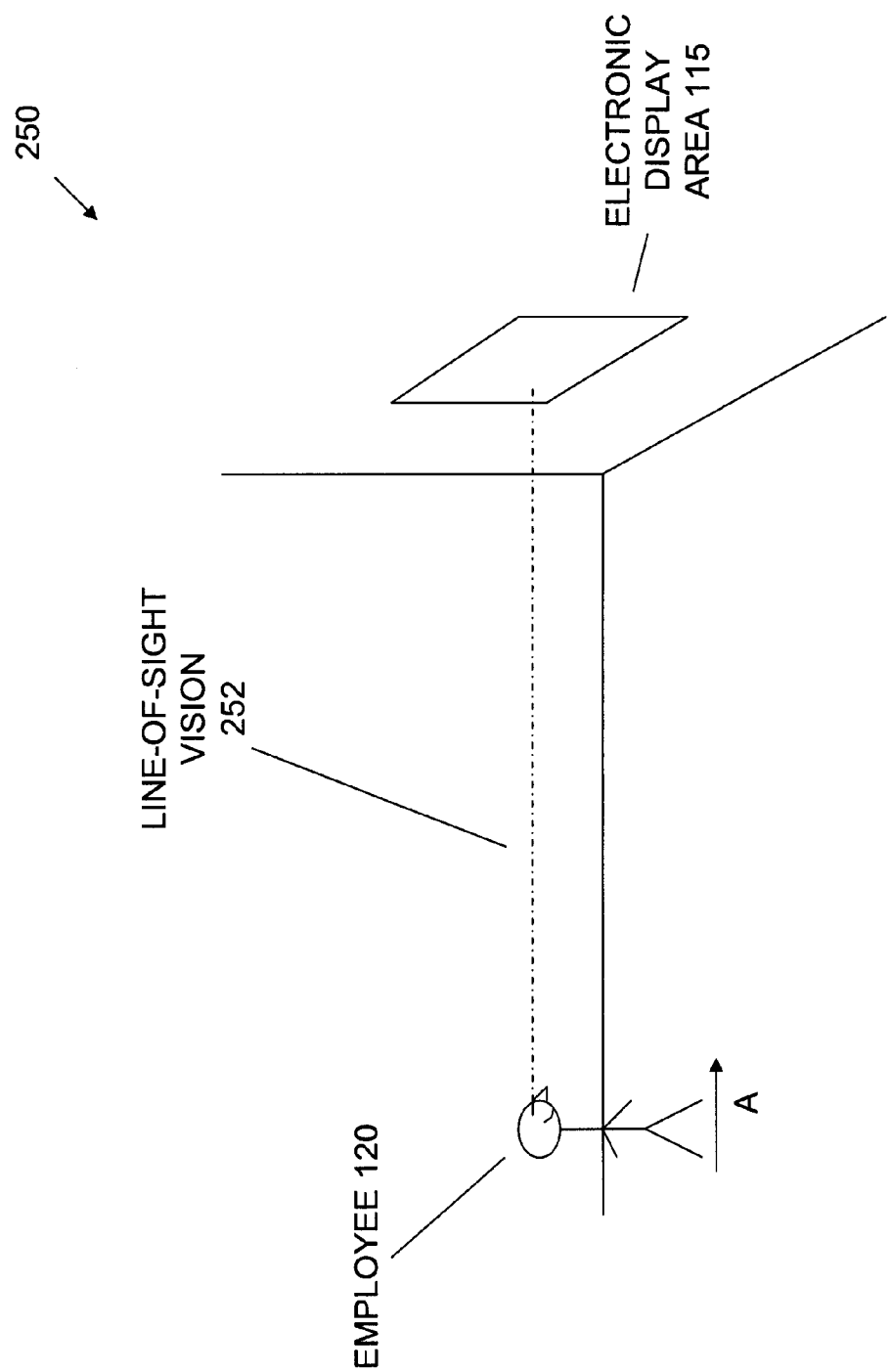

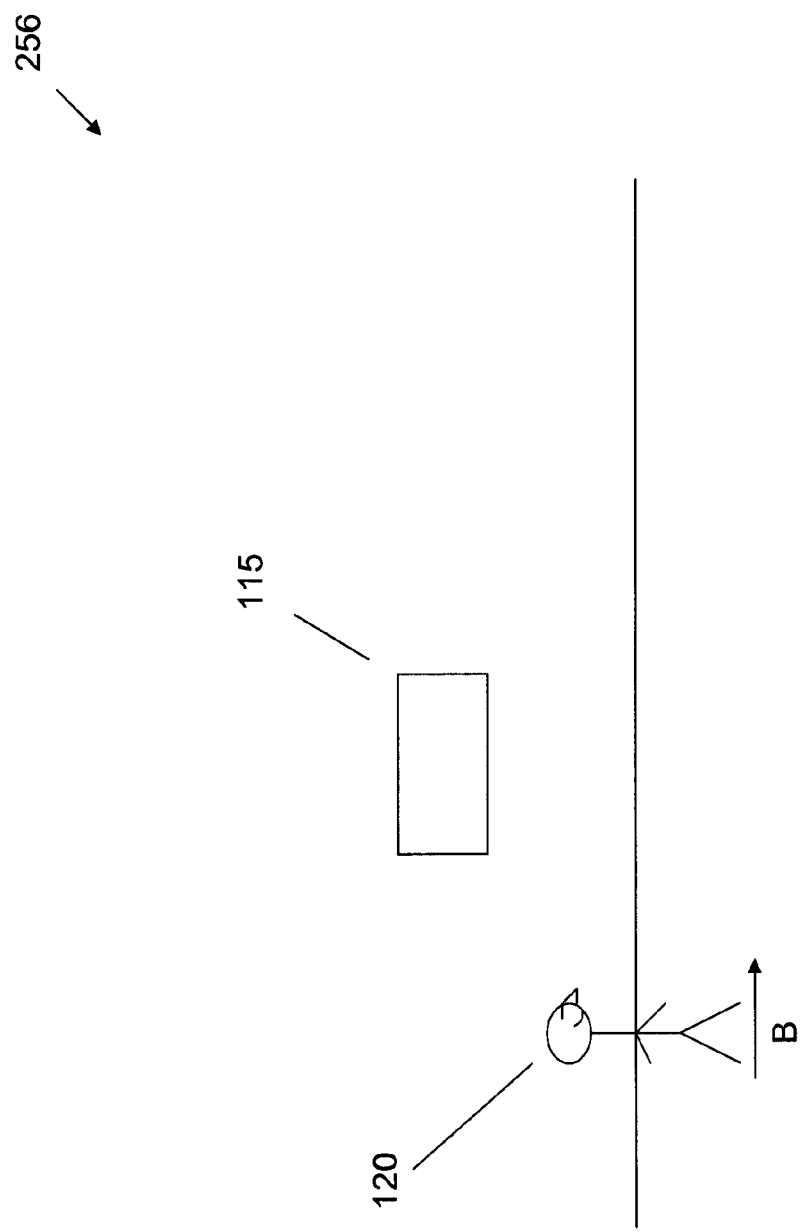

SYSTEM AND METHOD TO COMMUNICATE INFORMATION TO AN EMPLOYEE

CROSS REFERENCE TO RELATED APPLICATIONS

The present application is related to (1) U.S. Utility application serial number 11/867,281, filed on Oct. 4, 2007, and (2) U.S. Utility application serial number 11/867,331, filed on Oct. 4, 2007, the disclosures of which are incorporated herein by reference.

BACKGROUND

Employers often have a need to communicate information to their employees. Such information may relate to topics that may be of interest, for example, to the employees, the employer, or customers of the employer.

Conventionally, when attempting to communicate information to employees, employers may provide posters and fliers in high-traffic areas of buildings of the employer. The high traffic areas often become cluttered with the posters and fliers that contain information about past or future events, announcements, or other information. The posters and fliers may be stapled to bulletin boards or placed on easels. Over time, the information in the posters and fliers becomes outdated. Because of this, the employees may lose interest in the information posting area, and may rarely even look at new posters and fliers. Additionally, the easels may become unsightly tripping hazards, and fallen posters may litter the floor. The employer must expend a great deal of effort, time, coordination, and resources to update and maintain all the information posted around the buildings of the employer, and due to the amount of time that may be required to provide posters and fliers throughout all areas of the buildings of the employer, it may be difficult to communicate information to the employees in a timely manner.

Accordingly, it is desirable to provide an improved system and method to communicate information to an employee.

SUMMARY

Various embodiments of the present disclosure are directed to systems and methods to communicate information to an employee using an electronic display area. The electronic display area may include a variety of placements in an employment area, a call center, and/or a mobile device. The employer may communicate information to the employee through any or all of the display areas based on attributes of the display placement, the employee, and the employee location.

BRIEF DESCRIPTION OF THE DRAWINGS

FIG. 2C is a perspective view illustrating an embodiment of a room used in the method of FIG. 2A.

FIG. 2D is a perspective view illustrating an embodiment of a hallway having an electronic display area with a horizontal orientation used in the method of FIG. 2A.

FIG. 2I is a display shot illustrating an embodiment of a first image used in the method of FIG. 2A.

DETAILED DESCRIPTION

Figure 1A:
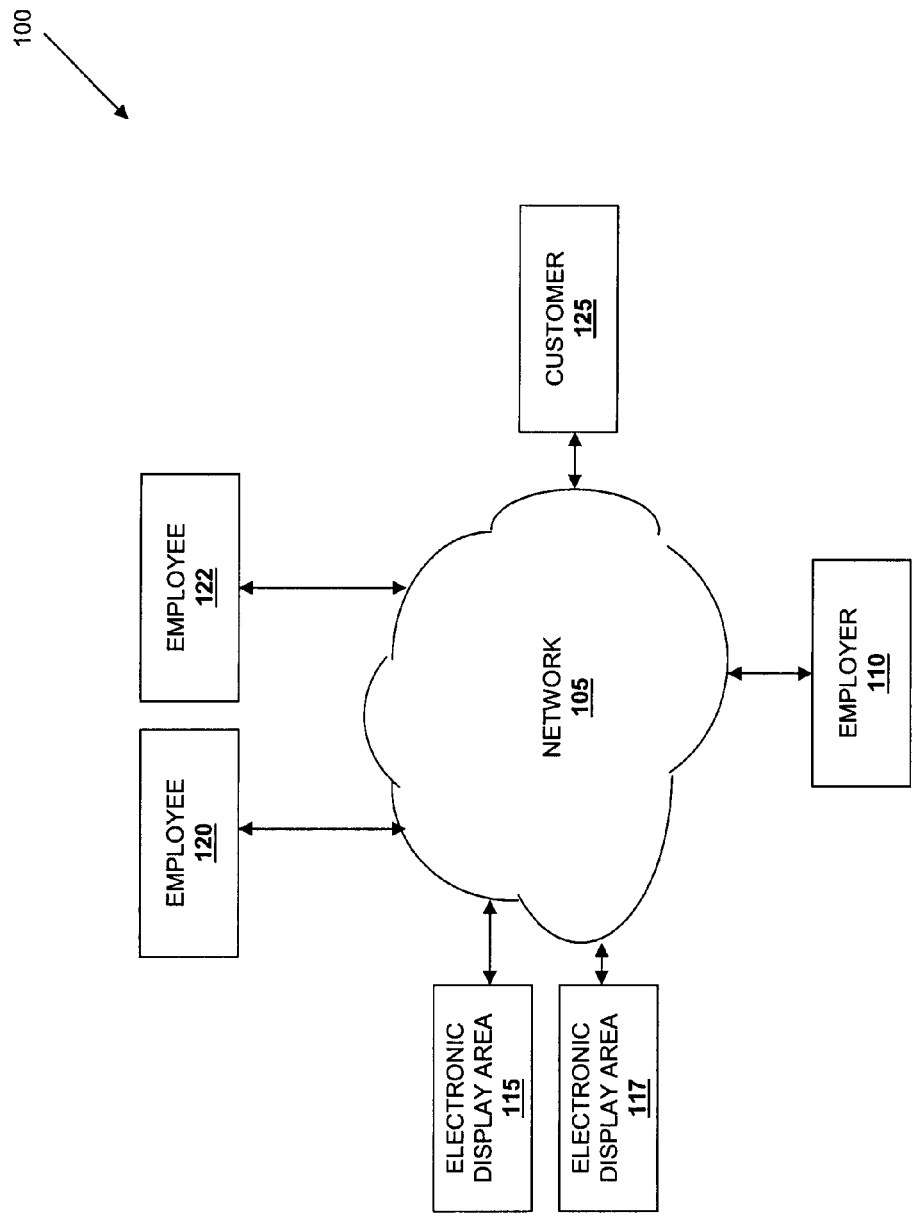
FIG. 1A is a schematic view illustrating an embodiment of a system to communicate information to an employee.

Referring now to FIG. 1A, in one embodiment, a system 100 to communicate information to an employee is illustrated. The system 100 includes a network 105 such as, for example, a Transport Control Protocol/Internet Protocol (TCP/IP) network (e.g., the Internet or an intranet). An employer 110, a plurality of electronic display areas 115 and 117, a plurality of employees 120 and 122 of the employer 110, and a customer 125 of the employer 110 may be operably coupled to the network 105 to allow communication between the employer 110, the electronic display areas 115 and 117, the employees 120 and 122, and the customer 125.

For clarity, FIG. 1A depicts only one employer 110, two electronic display areas 115 and 117, two employees 120 and 122, and one customer 125. However, the system 100 may include any plurality of employers, electronic display areas, employees, and customers. In the discussion below, the electronic display area 115 is a representative one of the electronic display areas 115 and 117. Likewise, in the discussion below, the employee 120 is a representative one of the employees 120 and 122.

In an embodiment, the employer 110 provides a product to the customer 125. The product may include products and/or services such as, for example, banking products, banking services, insurance products, insurance services, investment products, investment services, financial planning products, financial planning services, technical support products, technical support services, and/or a variety of other products and services known in the art.

In an embodiment, the electronic display area 115 is an area that may be used to electronically display images. The images may include, for example, single images, multiple images, still images, moving images, black and white images, color images, drawn images, photographic images, generated images, animation, video, text, simple graphics, complex graphics, and/or a variety of other image types known in the art. The electronic display area 115 may be used, for example, by the employer 110 to provide internal employee communication (e.g., communicating information to the employee). The internal employee communication may include, for example, communicating information to the employee 120. The information communicated to the employee 120 may include a message. In an embodiment, the electronic display area 115 is included on a mobile device. In an embodiment, the electronic display area 115 may produce audio along with the images.

In an embodiment, the electronic display area 115 includes a placement that may be described with reference to the location of the electronic display area 115 such as, for example, a placement outside a building, inside a building, in a room, in a hallway, in a hallway intersection, on a sidewalk, in a vehicle, on a vehicle, on a sign, in an office, at a set of coordinates, at an outdoor area, at an indoor area, and/or a variety of other locations known in the art. The placement may further include, for example, a position of the electronic display area 115, a height of the electronic display area 115, an angle of the electronic display area 115, an orientation of the electronic display area 115, a mounting surface to which the electronic display area 115 is mounted, a visibility of the electronic display area 115 by the employee 120, and/or a variety of other placement attributes known in the art. The height of the electronic display area 115 may be relative to a point such as, for example, the ground. The angle of the electronic display area 115 may be relative to a plane such as, for example, the mounting surface, a wall, a ceiling, and/or the ground. The orientation of the electronic display area 115 may be, for example, a vertical orientation (i.e., the vertical length is longer than the horizontal length) or horizontally oriented (i.e., the horizontal length is longer than the vertical length). The mounting surface may include, for example, a ceiling, a wall, a floor, and/or a variety of other surfaces known in the art. The visibility of the electronic display area 115 by the employee 120 may include, for example, an angle of a plane of the electronic display area 115 in relation to a line-of-sight vision of the employee 120, or a positioning of the electronic display area 115 in a peripheral vision of the employee. The line-of-sight vision of the employee 120 may include, for example, an imaginary line from the eyes of the employee 120 to a distant point. For example, when the employee 120 is looking directly at the electronic display area 115, the imaginary line of the line-of-sight vision of the employee 120 may extend from the eyes of the employee 120 to the electronic display area 115. The peripheral vision of the employee 120 may include, for example, areas that are visible to the eyes of the employee 120 that are not in the line-of-sight vision of the employee 120.

In an embodiment, the electronic display area 115 may be used by the employer 110 to communicate a single message. In an embodiment, the electronic display area 115 may be used by the employer 110 to communicate a plurality of messages. In an embodiment, each of the electronic display areas 115 and 117 may be used by the employer 110 to communicate the same message. In an embodiment, each of the electronic display areas 115 and 117 may be used by the employer 110 to communicate different messages (e.g., the electronic display area 115 may display a first message and the electronic display area 117 may display a second message). In an embodiment, the plurality of messages communicated using the electronic display area 115 may repeat at regular intervals. For clarity, in the embodiments below, a single message is described. However, one of skill in the art will recognize that a plurality of messages would not be outside the scope of the illustrated embodiments.

Each of the employer 110, the employee 120, and the customer 125 may include a respective network interface for communicating with the network 105 (i.e., outputting information to, and receiving information from, the network 105), such as by transferring information (e.g., instructions, data, signals) between the employer 110, the employee 120, and the customer 125. Accordingly, through the network 105, the employer 110 communicates with the employee 120 and the customer 125, the employee 120 communicates with the employer 110 and the customer 125, and the customer 125 communicates with the employer 110 and the employee 120. In an embodiment, the employee 120 and/or the customer 125 do not include a respective network interface, and thus other methods of communication may be used such as, for example, telephone, postal mail, in-person communication, and/or a variety of other forms of communication known in the art.

Additionally, the electronic display area 115 includes a network interface for sending and receiving information to and from the employer 110 and the employee 120 through the network 105. Information sent and received from the employer 110 may include, for example, display area information or parts thereof. The display area information may include information pertaining to the electronic display area 115 such as, for example, the placement of the electronic display area 115, a display type of the electronic display area 115, a configuration of the electronic display area 115 (e.g., resolution, brightness, contrast, tint, color), a screen size of the electronic display area 115, ambient lighting conditions of the electronic display area 115, visibility of the electronic display area 115, timing information, an audio configuration of the electronic display area 115, information about displayed messages, a nature of the displayed messages, a purpose of the displayed messages, a nature of work of the employees that view the electronic display area 115, a number of employees that view the electronic display area 115, information about viewing habits of the employees that view the electronic display area 115, and/or a variety of other display area information known in the art. The display type of the electronic display area 115 may include, for example, a wall or screen (e.g., for displaying images produced by a projector), a portable device, a liquid crystal display (LCD), an active matrix liquid crystal display (AMLCD), a computer monitor, a television, a plasma display, a cathode ray tube (CRT) display, an organic light-emitting diode (OLED) display, a digital light processing (DLP) display, a surface-conduction electron-emitter display (SED), a field emission display (FED), and/or a variety of other methods for electronically displaying images known in the art. In an embodiment, the electronic display area 115 may transfer the display area information or parts thereof to the employer 110 through the network 105. In an embodiment, the electronic display area 115 does not include a network interface, and thus the employer 110 may use other methods to communicate with the electronic display area 115 such as, for example, a storage medium (e.g., CD-ROM, CD-R, CD-RW, floppy disk), display cable (e.g., monitor cable, component cables, coaxial cable, HDMI cable, DVI cable), video projection, and/or any other form of electronic communication known in the art.

Each of the employer 110, the electronic display area 115, the employee 120, and the customer 125 may include a respective information handling system (IHS), a subsystem, or a part of a subsystem for executing processes and performing operations (e.g., processing or communicating information) in response thereto, as discussed further below. Each such IHS is formed by various electronic circuitry components. Moreover, as illustrated in FIG. 1A, all such IHSs may be coupled to each other through the network 105. Accordingly, the employer 110, the electronic display area 115, the employee 120, and/or the customer 125 may operate within the network. In an embodiment, the electronic display area 115, the employee 120, and/or the customer 125 may not include an IHS.

An IHS is an electronic device capable of processing, executing or otherwise handling information. Examples of an IHS include a server computer, a personal computer (e.g., a desktop computer or a portable computer such as, for example, a laptop computer), or a handheld computer. Examples of an IHS also include a router, a switch, and other devices coupled to a network (e.g., the network 105).

Figure 1B:
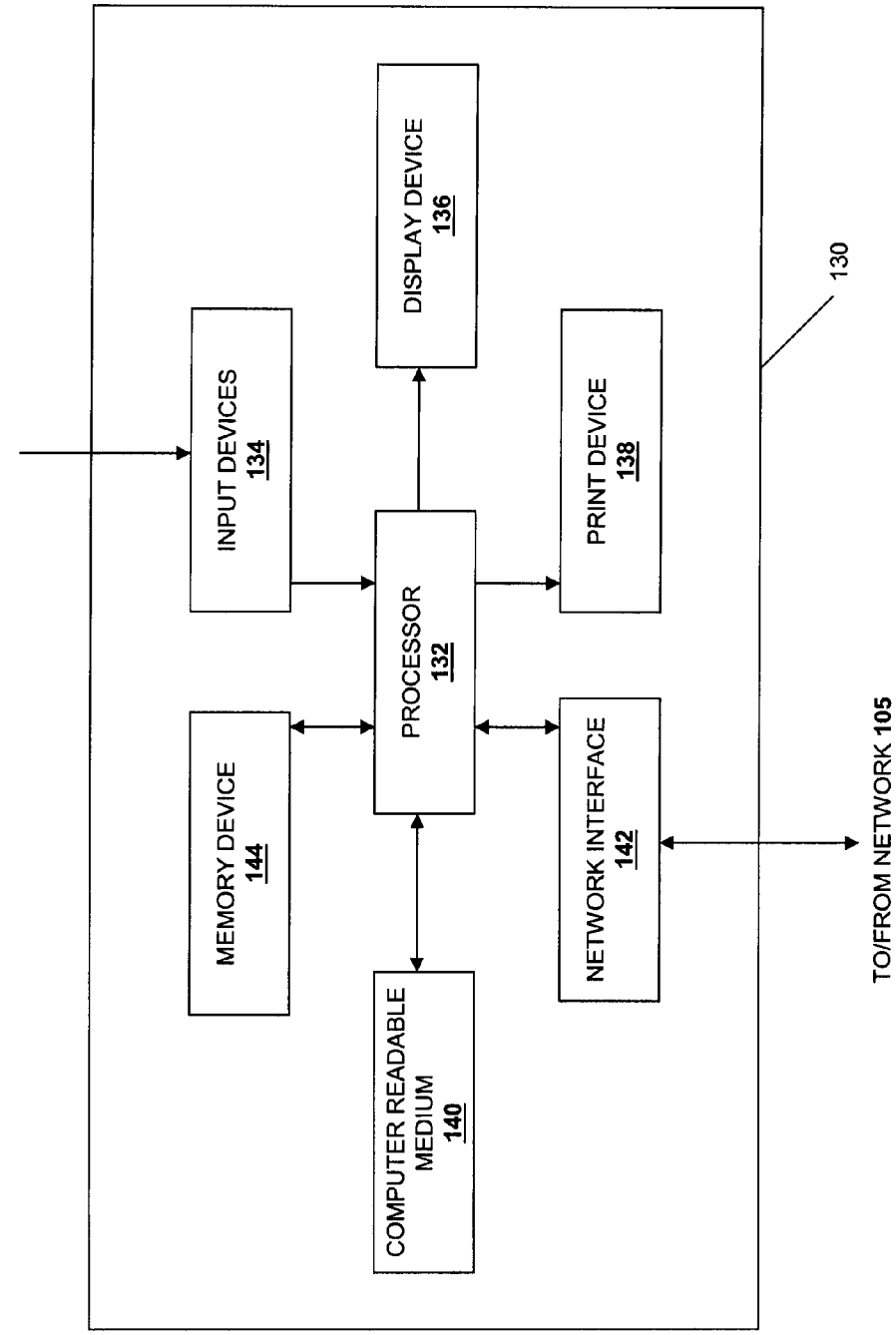
FIG. 1B is a schematic view illustrating an embodiment of an information handling system used with the system to communicate information to an employee of FIG. 1A.

Referring now to FIG. 1B, an IHS 130 which is representative of one of the IHSs described above is illustrated. The IHS 130 may include any or all of the following: (a) a processor 132 for executing and otherwise processing instructions; (b) a plurality of input devices 134 for inputting information; (c) a display device 136 (e.g., a conventional electronic cathode ray tube (CRT) device or a conventional liquid crystal display (LCD)) for displaying information; (d) a print device 138 (e.g. a conventional electronic printer or plotter) for printing visual images (e.g., textual or graphic information on paper), scanning visual images, and/or faxing visual images; (e) a computer-readable medium 140 for storing information, as discussed further below; (f) a network interface 142 (e.g., circuitry) for communicating between the processor 132 and the network 105; (g) a memory device 144 (e.g., a random access memory (RAM) device or a read-only memory (ROM) device) for storing information (e.g., instructions executed by the processor 132 and data operated upon by the processor 132 in response to such instructions); and (h) various other electronic circuitry for performing other operations of the IHS 130 known in the art. Accordingly the processor 132 is operably coupled to the plurality of input devices 134, the display device 136, the print device 138, the computer-readable medium 140, the network interface 142, and the memory device 144, as illustrated in FIG. 1b.

For example, in response to signals from the processor 132, the display device 136 displays visual images. Information may be input to the processor 132 from the input devices 134, and the processor 132 may receive such information from the input devices 134. Also, in response to signals from the processor 132, the print device 138 may print visual images on paper, scan visual images, and/or fax visual images.

The input devices 134 include a variety of input devices known in the art such as, for example, a conventional electronic keyboard and a pointing device such as, for example, a conventional electronic mouse, a trackball, or a light pen. The keyboard may be operated to input alphanumeric text information to the processor 132, and the processor 132 may receive such alphanumeric text information from the keyboard. The pointing device may be operated to input cursor-control information to the processor 132, and the processor 132 may receive such cursor-control information from the pointing device.

The computer-readable medium 140 and the processor 132 are structurally and functionally interrelated with one another as described below in further detail. Each IHS of the illustrative embodiment is structurally and functionally interrelated with a respective computer-readable medium, similar to the manner in which the processor 132 is structurally and functionally interrelated with the computer-readable medium 140. In that regard, the computer-readable medium 140 is a representative one of such computer-readable media including, for example, but not limited to, a hard disk drive.

The computer-readable medium 140 stores (e.g., encodes, records, or embodies) functional descriptive material (e.g., including but not limited to software (also referred to as computer programs or applications) or data structures). Such functional descriptive material imparts functionality when encoded on the computer-readable medium 140. Also, such functional descriptive material is structurally and functionally interrelated to the computer-readable medium 140.

With such functional descriptive material, data structures define structural and functional interrelationships between such data structures and the computer-readable medium 140 (and other aspects of the IHS 130). Such interrelationships permit the data structures' functionality to be realized. Also, within such functional descriptive material, computer programs define structural and functional interrelationships between such computer programs and the computer-readable medium 140 (and other aspects of the IHS 130). Such interrelationships permit the computer programs' functionality to be realized.

For example, the processor 132 reads (i.e., accesses or copies) such functional descriptive material from the computer-readable medium 140 onto the memory device 144 of the IHS 130, and the IHS 130 (more particularly, the processor 132) performs its operations, as described elsewhere herein, in response to such material that is stored in the memory device 144 of the IHS 130. More particularly, the processor 132 performs the operation of processing a computer application (that is stored, encoded, recorded, or embodied on a computer-readable medium such as computer-readable medium 140) for causing the processor 132 to perform additional operations, as described elsewhere herein. Accordingly, such functional descriptive material exhibits a functional interrelationship with the way in which processor 132 executes its processes and performs its operations.

Further, the computer-readable medium 140 is an apparatus from which the computer application is accessible and processable by the processor 132. When the computer application is accessed and processed by the processor 132, the computer application may cause the processor 132 to perform such additional operations. In addition to reading such functional descriptive material from the computer-readable medium 140, the processor 132 is capable of reading such functional descriptive material from (or through) the network 105 which is also a computer-readable medium (or apparatus). Moreover, the memory device 144 of the IHS 130 is itself a computer-readable medium (or apparatus).

Figure 1C:
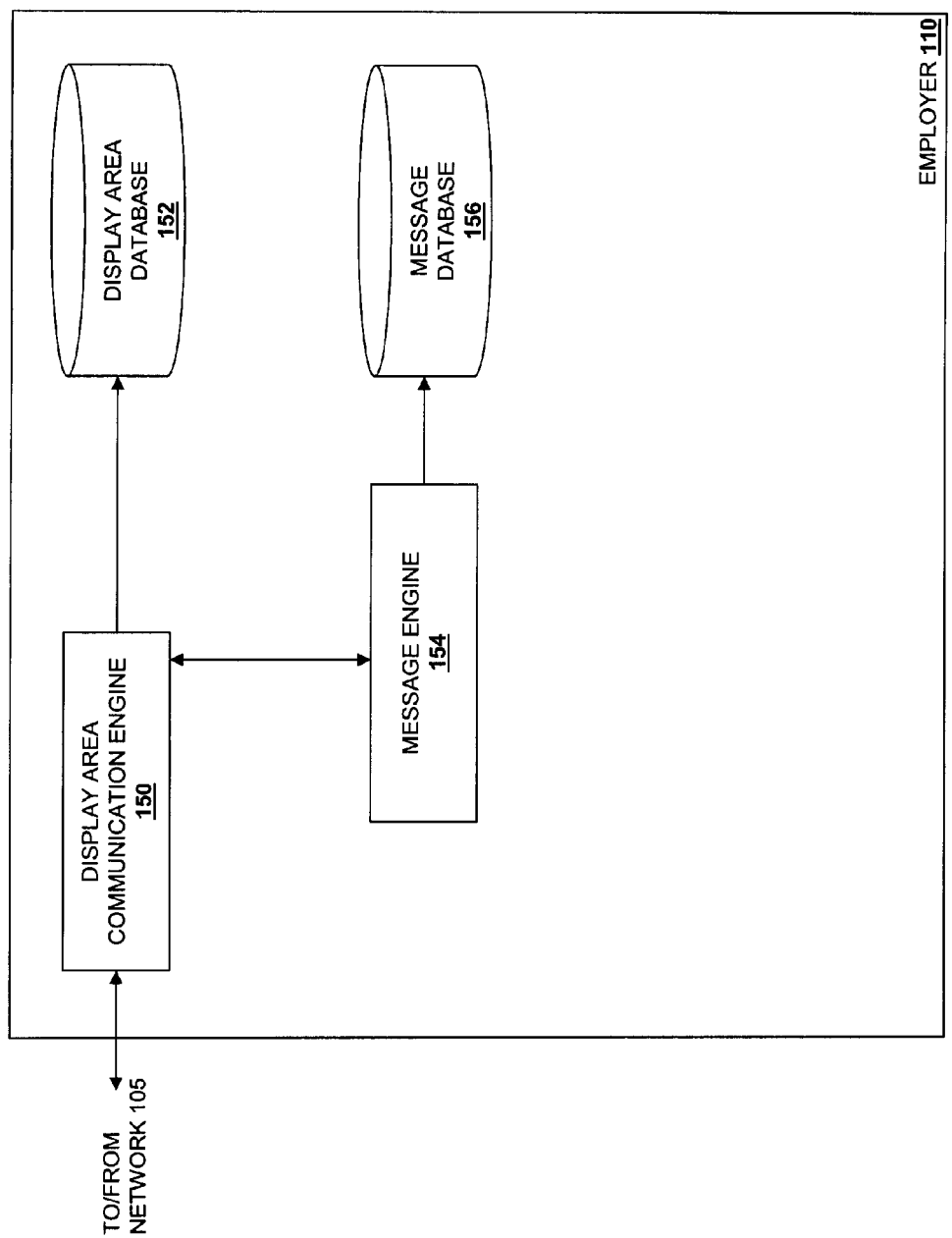
FIG. 1C is a schematic view illustrating an embodiment of an employer used in the system to communicate information to an employee of FIG. 1A.

Referring now to FIGS. 1A, 1B and 1C, the employer 110 is illustrated in more detail. A display area communication engine 150, which may be, for example, software stored on the computer-readable medium 140 in the IHS 130, is included in the employer 110 and is operably coupled to the network 105, a display area database 152, and a message engine 154. The message engine 154, which may be, for example, software stored on the computer-readable medium 140 in the IHS 130, is operably coupled to the display area communication engine 150 and a message database 156. In an embodiment, the display area database 152 and the message database 156 are conventional databases known in the art. In an embodiment, the display area database 152 and the message database 156 may be located outside the employer 110 and be operably coupled to the employee communication engine 150 and the message engine 154 through, for example, the network 105. In an embodiment, the display area database 152 and the message database 156 each include a plurality of databases. In an embodiment, the display area database 152 and the message database 156 are publicly available databases. In an embodiment, the display area database 152 and the message database 156 are private databases that are accessible by the employer 110.

The display area database 152 may include, for example, the display area information, described above. The message database 156 may include, for example, message information. The message information may include details relating to the presentation of the message such as, for example, content, timing details, target groups, target electronic display areas, a target time frame, authors, a type of message, and/or a variety of other details known in the art. The content of the message may include, for example, text, images, graphics, animation, audio, and/or a variety of other content known in the art. The timing details of the message information may include, for example, a length and chronological order with which to display certain portions of the message. The target groups may include, for example, groups of employees for which the message is intended to be displayed. The target electronic display areas may include, for example, the electronic display areas for which the message is intended to be displayed. The target time frame may include, for example, ranges of time during which the message is intended to be displayed. The authors may include, for example, originators and/or designers of the message.

The type of message may include a classification of the content of the message such as, for example, new product information, employee benefits information, event information, outstanding employee success information, business objective information, cultural awareness information, an employer of choice message, company benefits information, company award information, universal information, specific information, noble mission information, entertainment information, product information, real-time product information, a custom message from a content manager, information about a product offered by a provider other than the employer 110, calendar information, employment information, news information, and/or a variety of other classifications of content known in the art.

The new product information may include, for example, information about a product not previously offered that is currently offered. The employee benefits information may include information about, for example, health benefits (e.g., health insurance, HMO, PPO), financial benefits (e.g., 401(k), stock discounts), and/or a variety of other employee benefits known in the art. The event information may include information about, for example, parties, celebrations, blood drives, social activities, and/or a variety of other events known in the art. The outstanding employee successes information may include information pertaining to successes of the employee 120 such as, for example, promotions, raises, assignments, completed projects, customer satisfactions, achieved sales targets, achievements, client acquisitions, and/or a variety of other employee successes known in the art. The business objective information may include information about, for example, gaining market share, increasing earnings, increasing revenue, creating the product, selling the product, expanding the product, marketing the product, and/or a variety of other business objectives known in the art. The cultural awareness information may pertain to the employer 110 and/or the employee 120, and may include information about, for example, environments, attitudes, mottos, missions, emotions, encouragements, motivations, inspirations, diversity awareness, military awareness, employee recognition, and/or a variety of other employment-related cultural aspects known in the art. The employer of choice message may include information about why it may be desirable to work for the employer 110 rather than for other employers such as, for example, higher employee satisfaction, higher diversity, higher salaries, and/or a variety of other desirable employer information known in the art. The company benefits information may include information about why it may be desirable to work for the employer 110 such as, for example, employee satisfaction, diversity, high salaries, and/or a variety of other desirable employer information known in the art. The company award information may include information about, for example, awards (e.g. recognitions, trophies, plaques, designations, money) provided by the employer 110 and/or a third party, to the employee 120 and/or the employer 110, wherein the award may be provided, for example, for excellence, courteousness, achievement, improvement, accomplishment, and/or a variety of other reasons known in the art. The universal information may include, for example, information that the employer 110 desires to communicate to all employees of the employer 110. The specific information may include, for example, information that the employer 110 desires to communicate to a specific group of employees of the employer 110. The specific group of employees may be selected using criteria such as, for example, a geographic location of the employees, a type of work done by the employees, the product worked on by the employees, and/or a variety of other criteria known in the art. The noble mission information may include information about, for example, actions performed by the employer 110 and/or the employee 120 that may be perceived as honorable such as, for example, providing support to members of a military unit, doing volunteer work, giving to a charity, and/or a variety of other honorable actions known in the art. The entertainment information may include information about, for example, events, concerts, music, athletics, movies, theme parks, races, and/or a variety of other forms of entertainment known in the art. The product information may include information about, for example, the product offered by the employer 110 and/or the product offered by the provider other than the employer 110 and may include, for example, various products and services offered in the past, present, and/or future. The real-time product information may include, for example, up-to-the-minute news and information pertaining to the product offered by the employer 110 and/or the product offered by the provider other than the employer 110. The custom message from the content manager may include, for example, a message originated by the content manager, described in further detail below. Alternatively, the custom message from the content manager may include, for example, a message originated by an entity other than the content manager that is approved by the content manager. The calendar information may include, for example, dates and information corresponding to events, deadlines, and/or a variety of other calendar information known in the art. The employment information may include, for example, employee information (e.g., information about the employee 120), employer information (e.g., information about the employer 110), recreational information, business culture information, human resources information, and/or a variety of other forms of employment information known in the art. The recreational information may include information about, for example, athletics, competitions, races, parties, events, movies, concerts, music, snacks, and/or a variety of other recreational information known in the art. The business culture information may include information about, for example, the cultural awareness information and/or a variety of other forms of business culture information known in the art. The human resources information may include information about, for example, coordination of benefits, salaries, paychecks, administration, holidays, vacation, and/or a variety of other forms of human resources information known in the art. The news information may include information, for example, about news relating to the employer 110, a competitor of the employer 110, a provider other than the employer 110, a third party, the employee 120, and/or a variety of other news-related information known in the art.

In an embodiment, the content manager may be an employee of the employer 110. Alternatively, the content manager may be, for example, the employer 110, a provider other than the employer 110, and/or any other entity known in the art. The content manager may be responsible for gathering, creating, validating, editing, scheduling, reviewing, and/or approving the content of the message. In an embodiment, the content manager may determine if the message is suitable to be communicated to the employee 120. The determination may be performed using criteria such as, for example, values-based judgment, priority, schedule availability, schedule timing, information security, content criteria, and/or a variety of other criteria known in the art.

The message engine 154 may be used, for example, to access the message information in the message database 156 and provide the message information to the display area communication engine 150. In an embodiment, the message engine 154 may be used to create and/or edit the message. The display area communication engine 150 may be used to access the display area information in the display area database 152 and provide the message information and the display area information to the electronic display area 115 through the network 105. In an embodiment, the display area communication engine 150 and/or the message engine 154 may include a digital signage software program on the IHS 130 such as, for example, software available from Scala Broadcast Multimedia (www.scala.com), Navori, Inc. (www.navori.com), and/or XStream Solutions (www.xstreamsolution.com).

Referring now to FIGS. 1A, 1B, 1C, 2A and 2B, an embodiment of a method 200 to communicate information to an employee is illustrated. The method 200 begins at block 202, where the electronic display area 115 is provided by the employer 110. The electronic display area may be provided at various locations in an employment area 218. In an embodiment, the employment area 218 may be a location where the employee 120 is performing work for the employer 110. The employment area 218 may be, for example, owned, leased, and/or rented by the employer 110. In an embodiment, the employment area 218 may include a campus, an office building, a home office, a mobile office, a vehicle, and/or a variety of other employment areas known in the art.

In an embodiment, the employee 120 may be in transit and/or stationary. The employee 120 may be in transit, for example, during the time between when the employee 120 departs from an original location and arrives at a destination. For example, the employee 120 may be in transit when the employee 120 is walking to and/or from a meeting, entering and exiting a building, standing in a cafeteria line, and/or a variety of other employee transit known in the art. In an embodiment, the employee 120 may spend a considerable amount of time in transit per day. For example, in a study done by an employer, it was found that each of its employees spends an average of 28 minutes per day in transit. The employee 120 may be stationary, for example, at times when the employee 120 is not traveling toward a destination. For example, if the employee 120 is in a first office and is not traveling toward a second office, the employee 120 may be stationary and not in transit. If the employee 120 has departed from the first office and is traveling through a hallway toward the second office, the employee 120 may be in transit and not stationary. In an embodiment, the employee 120 may be both in transit and stationary. For example, if the employee 120 has departed from the first office, intends to arrive at the second office, but is in a hallway and not presently traveling, for example, because the employee 120 has stopped in the hallway to communicate with the employee 122, or because the employee 120 is waiting in a line, then the employee 120 may be both in transit and stationary. In an embodiment, a location that may contain the employee 120 while the employee 120 is in transit, and either stationary or not stationary, may be referred to as a transit area. For example, the transit area may be a hallway, a sidewalk, a road, a driveway, a parking lot, and/or a variety of other locations or areas of transit known in the art. A location containing the employee 120 where the employee 120 is both in transit and stationary may be referred to as a holding pen. For example, the holding pen may include a vending machine area, a break room, a cafeteria, a hallway, and/or a variety of other locations or areas known in the art. In an embodiment, the holding pen may include a lobby and/or a waiting area where the employee 120 may be waiting to meet an individual. In an embodiment, the holding pen may include a financial drive-thru window lane where the employee 120 is seated in a vehicle waiting to receive a financial product and/or service.

Figure 2A:
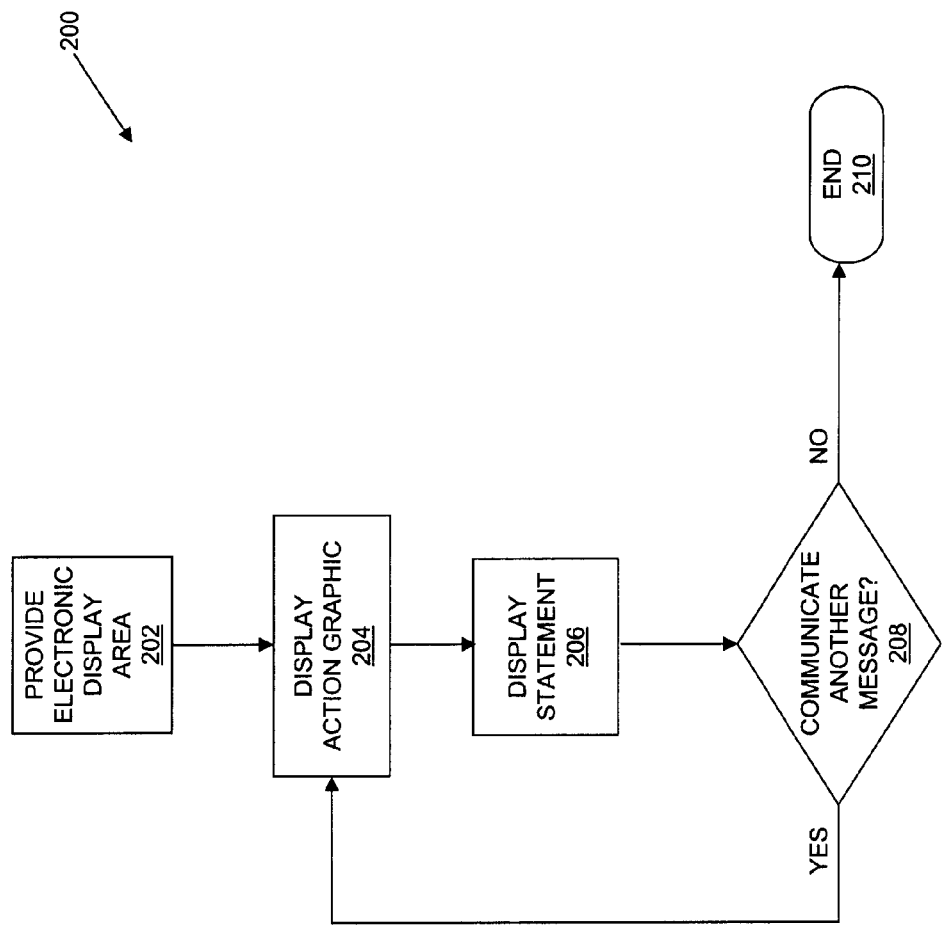
FIG. 2A is a flow chart illustrating an embodiment of a method to communicate information to an employee.
Figure 2B:
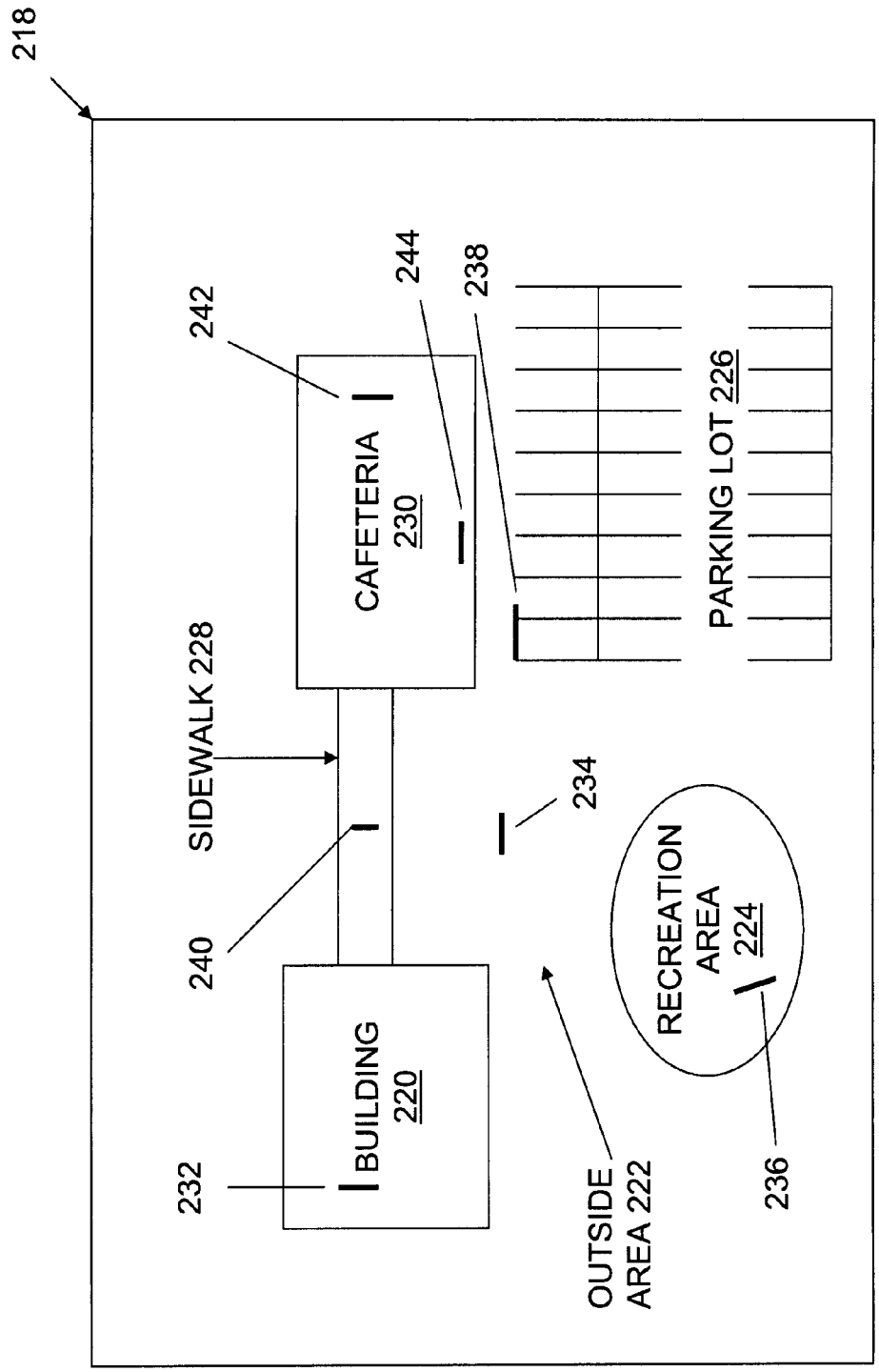
FIG. 2B is an aerial view illustrating an embodiment of an employment area used in the method of FIG. 2A.
Figure 2E:
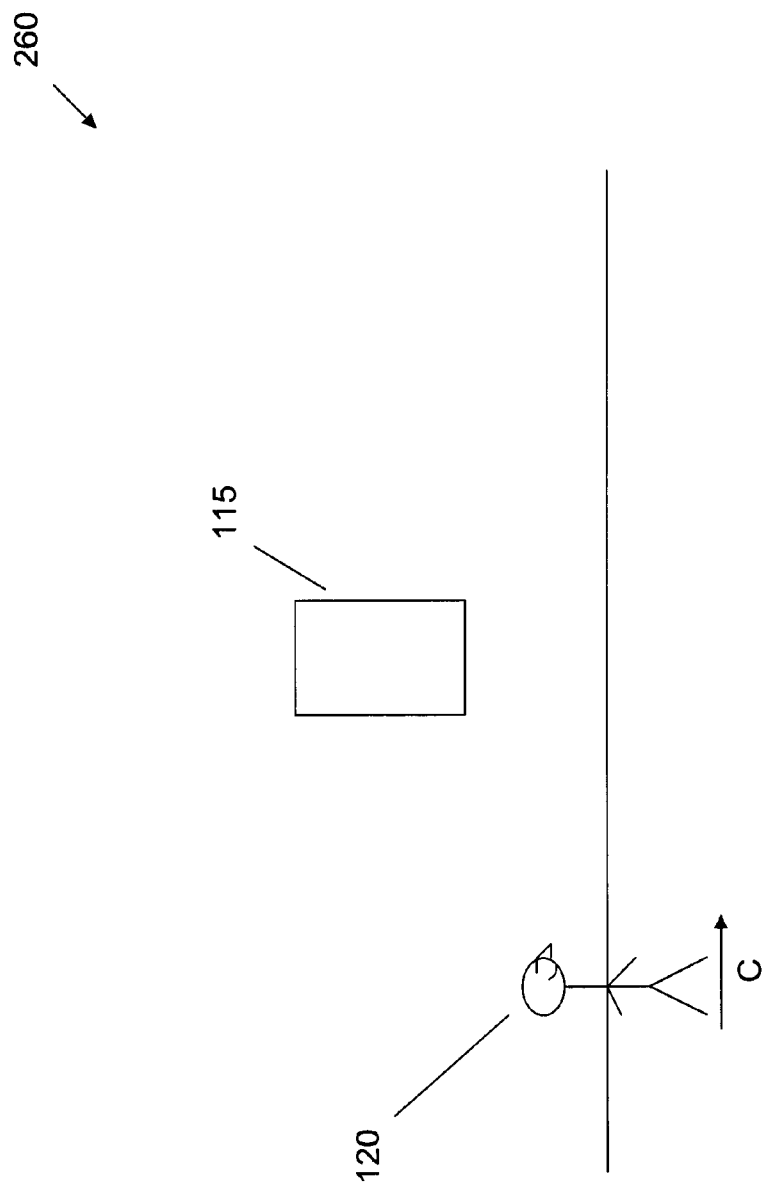
FIG. 2E is a perspective view illustrating an embodiment of a hallway, including an electronic display area with a vertical orientation used in the method of FIG. 2A.
Figure 2F:
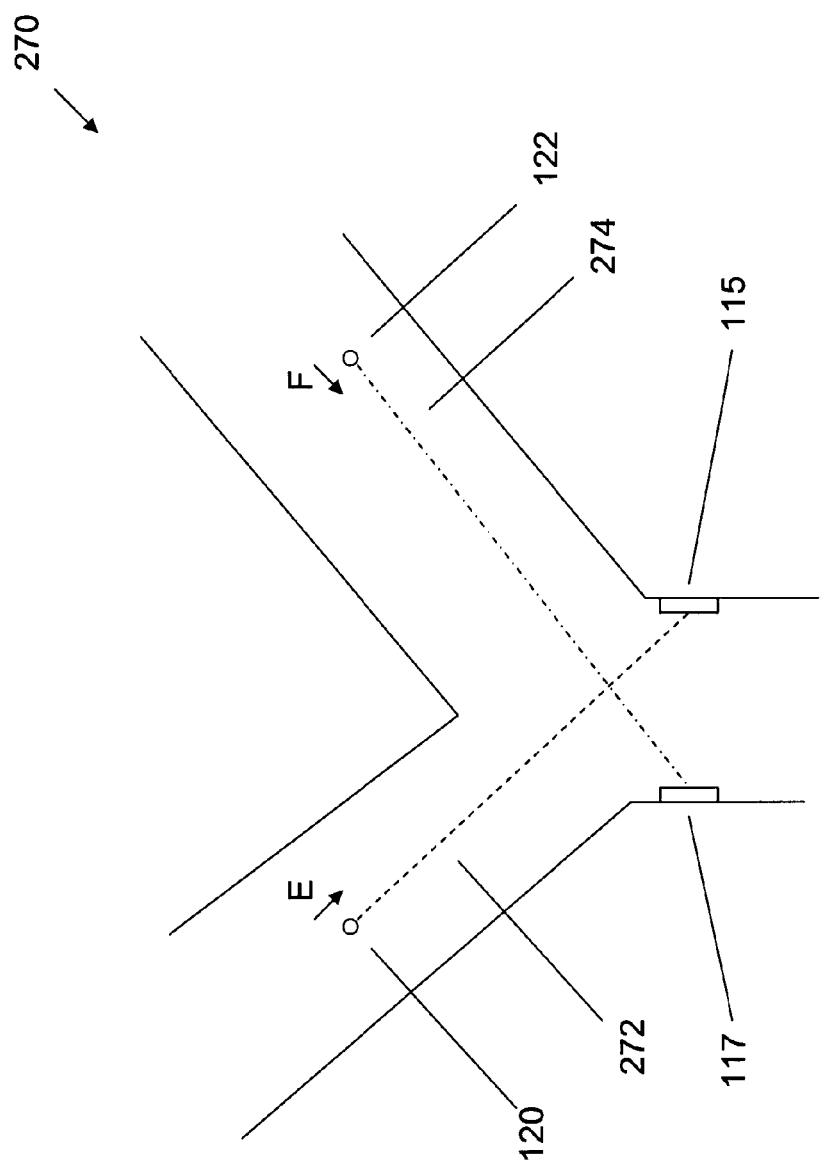
FIG. 2F is an aerial view illustrating an embodiment of a hallway intersection, including electronic display areas mounted to opposing walls used in the method of FIG. 2A.
Figure 2G:
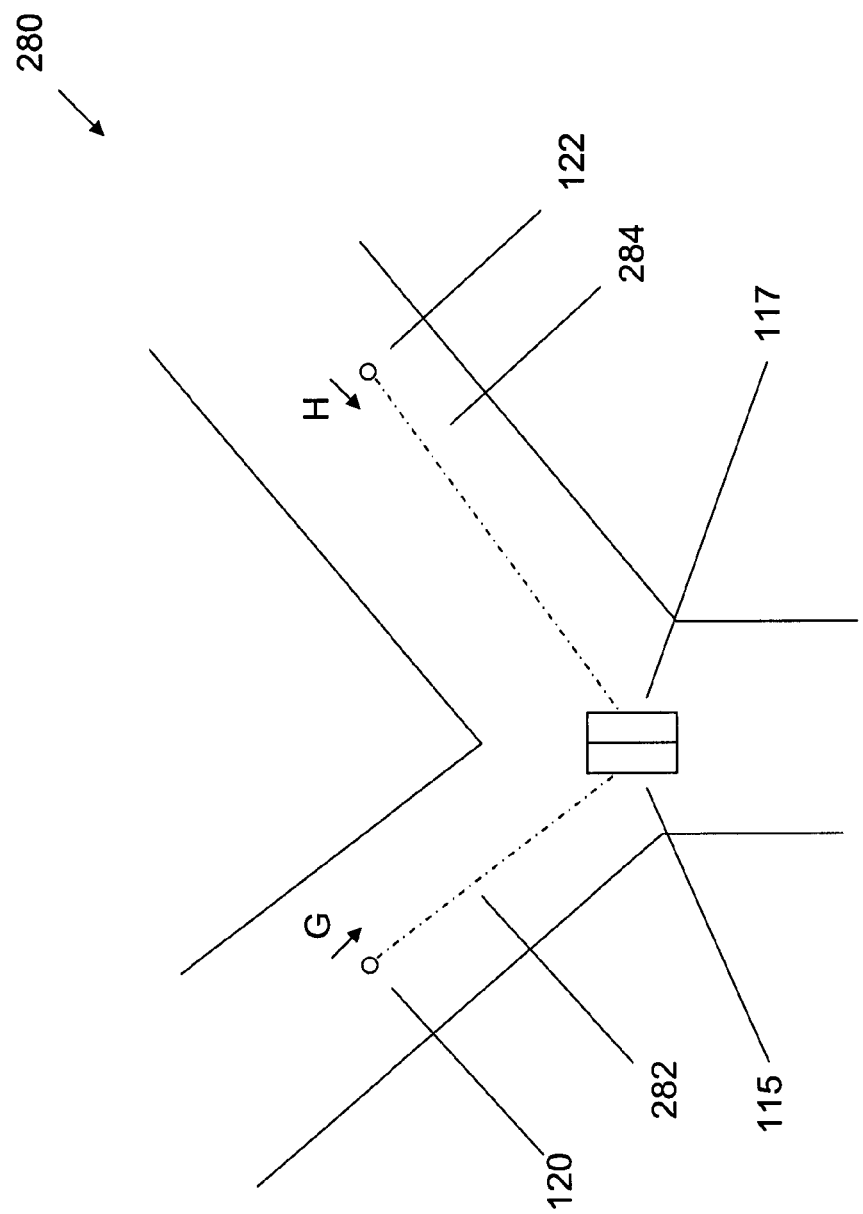
FIG. 2G is an aerial view illustrating an embodiment of a hallway intersection, including electronic display areas used in the method of FIG. 2A.
Figure 2H:
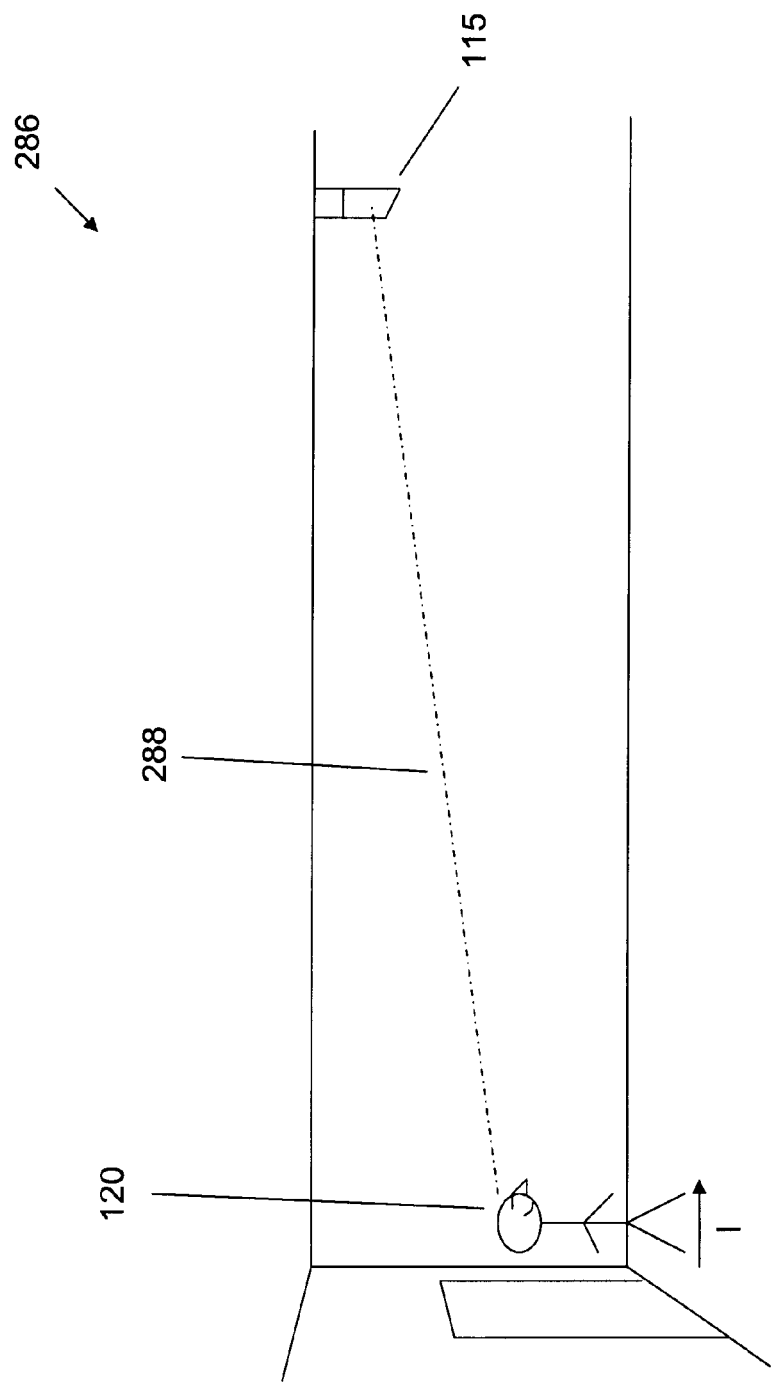
FIG. 2H is a perspective view illustrating an embodiment of a room used in the method of FIG. 2A.
Figure 21:
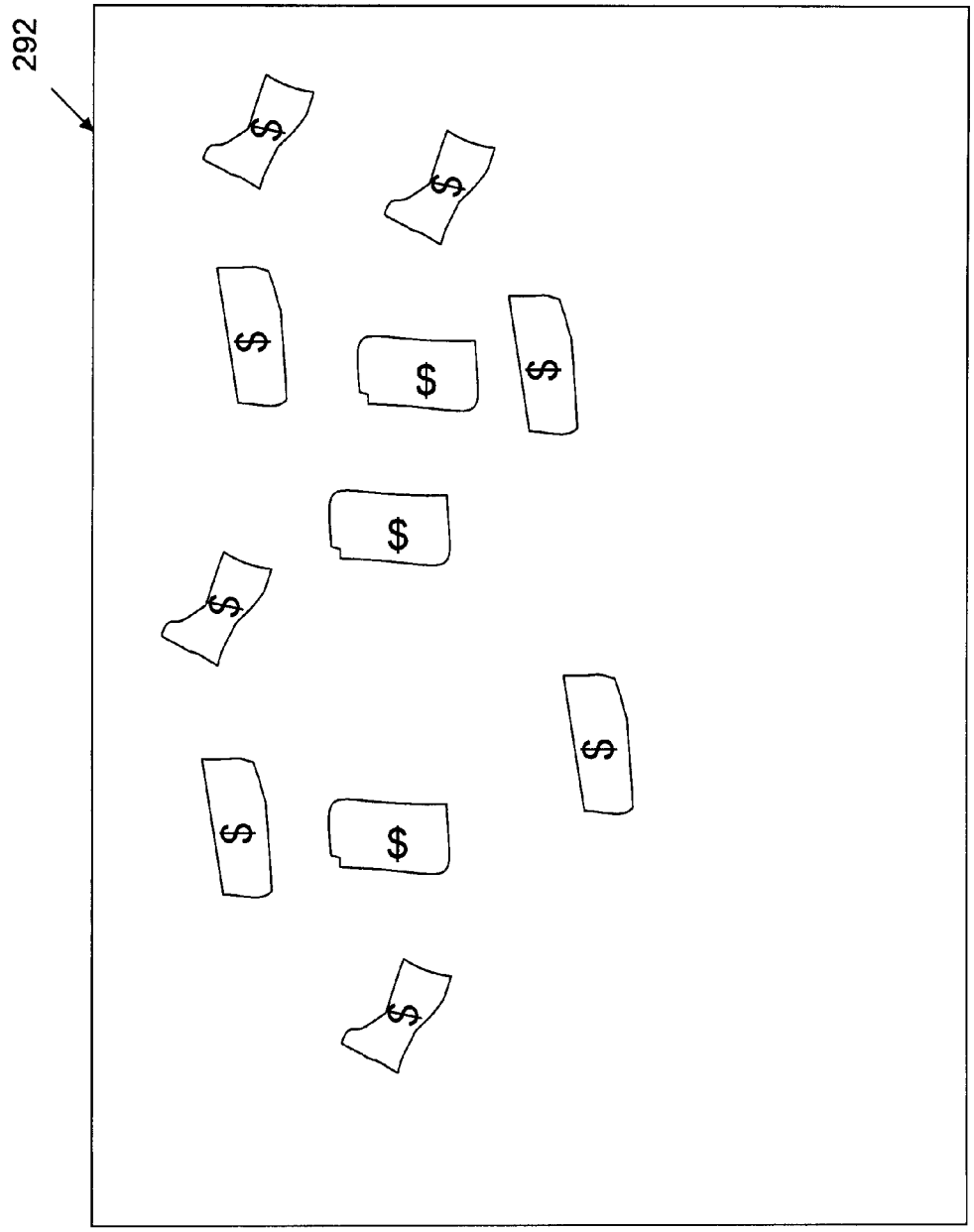
Figure 2J:
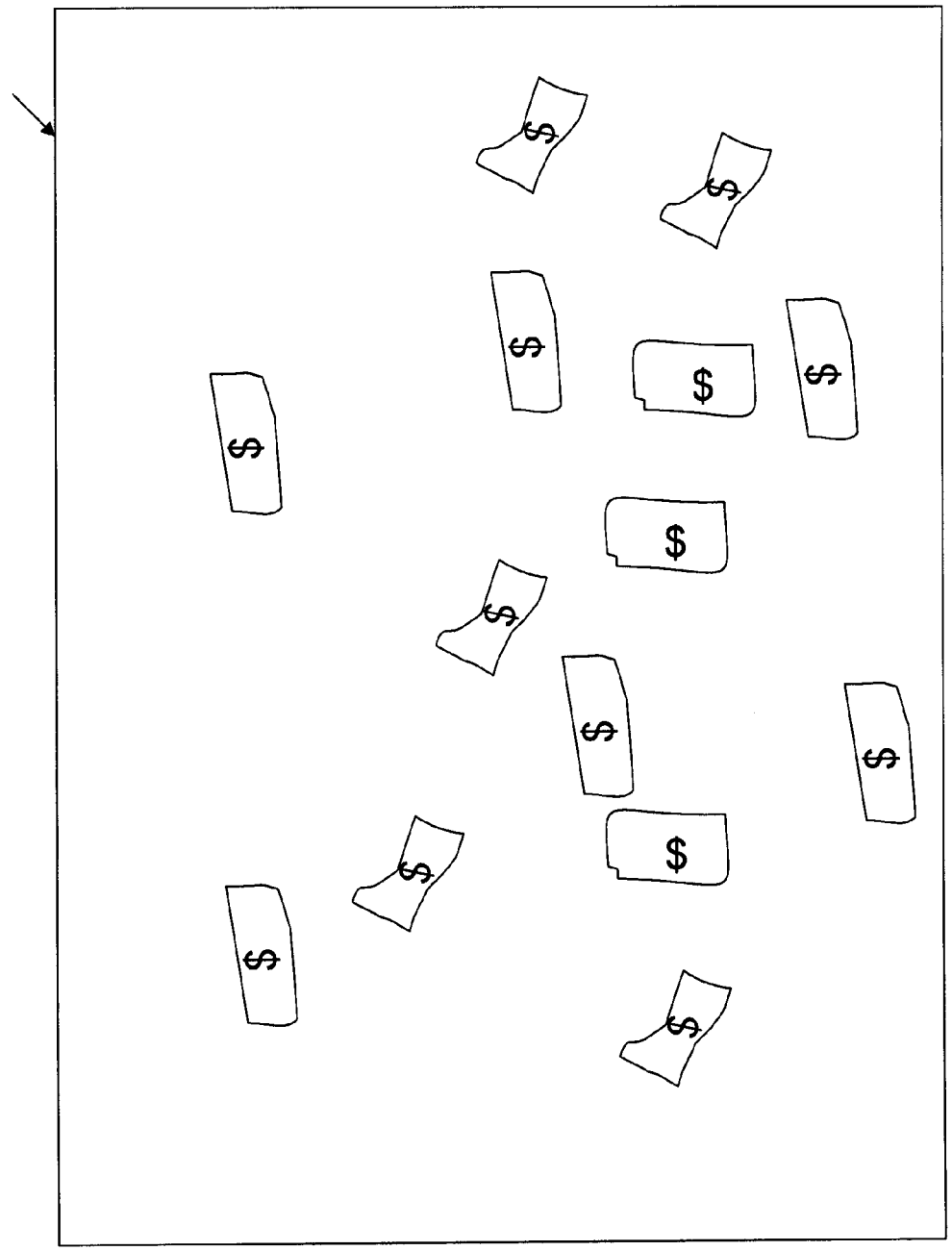
FIG. 2J is a display shot illustrating an embodiment of a second image used in the method of FIG. 2A.
Figure 2K:
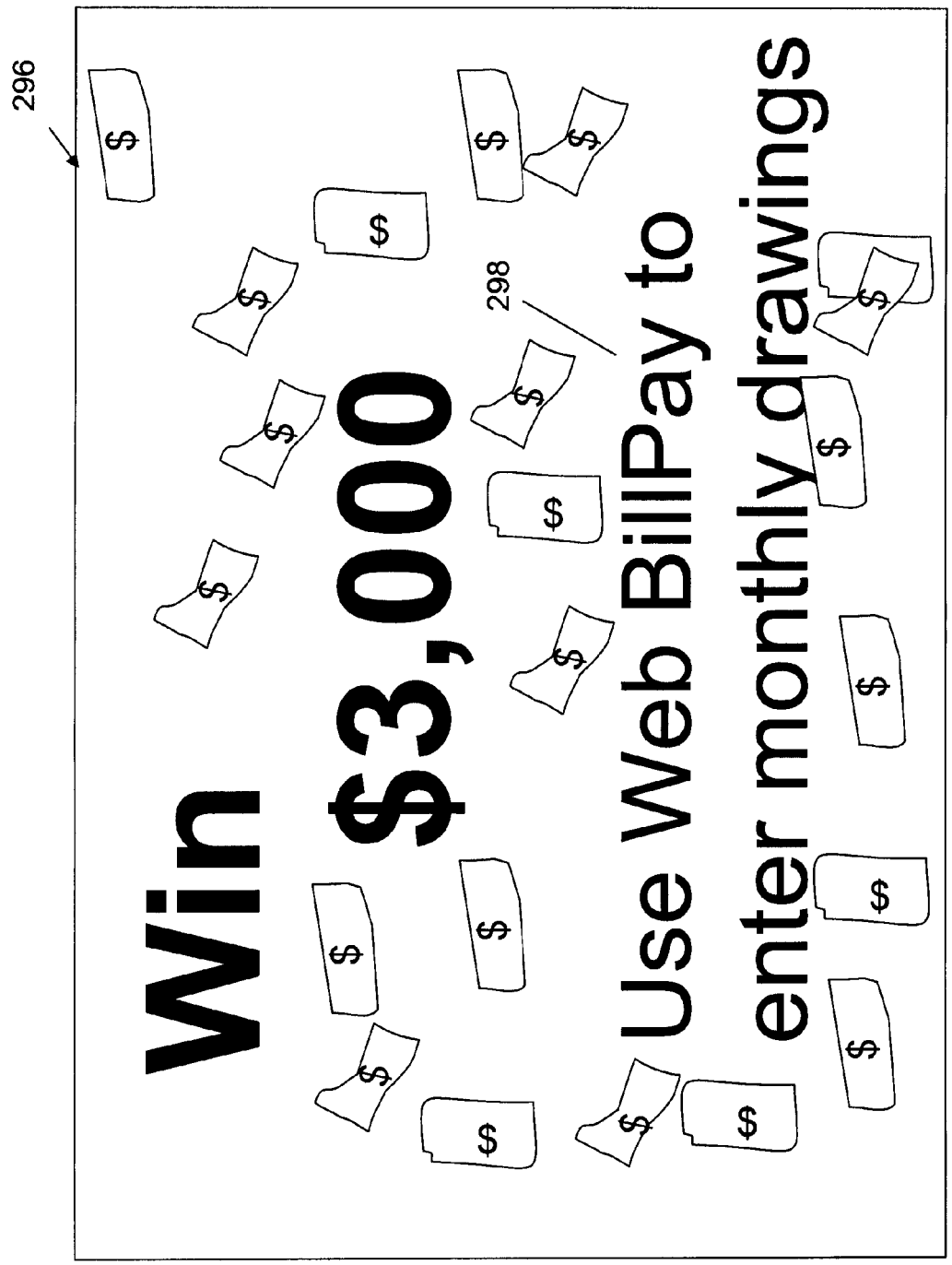
FIG. 2K is a display shot illustrating an embodiment of a third image used in the method of FIG. 2A.

The placement of the electronic display area 115 may be in any of a variety of areas in the employment area 218 such as, for example, inside a building 220, in a room within the building 220 (e.g., conference room, meeting room, break room, bathroom), on an external wall of the building 220, on an internal wall of the building 220, on a floor of the building 220, on a ceiling of the building 220, in a transit area, in a holding pen, at an outside area 222, in a recreational area 224, in a vehicle of the employer 110, in a vehicle of the employee 120, on a sign of the employer 110, in a home office of the employee 120, and/or a variety of other locations known in the art. The transit area, described above, may include, for example, a hallway in the building 220, a road or driveway in the employment area 218, a parking lot 226, a sidewalk 228, and/or a variety of other transit areas known in the art. The holding pen, described above, may include, for example, a break room in the building 220, a cafeteria 230, a vending machine area in the building 220, a lobby of the building 220, a waiting area of the building 220, a drive-thru window area of the employment area 218, and/or a variety of other locations known in the art. In an embodiment, the electronic display area 115 may be placed in the holding pen, wherein the electronic display area 115 displays a message informing the employee 120, for example, that the employee 120 may receive a financial product and/or service online (e.g., using a Web page on the Internet). In an embodiment, the message displayed by the electronic display area 115 in the holding pen may, for example, entertain and/or distract the employee 120 such that, for example, the employee 120 may perceive a diminished wait time. In an alternative embodiment, the electronic display area 115 is provided by a provider other than the employer 110. The illustrated embodiment of FIG. 2B shows a plurality of electronic display areas 232, 234, 236, 238, and 240 in the building 220, the outside area 222, the recreation area 224, the parking lot 226, and the sidewalk 228, respectively, and a plurality of electronic display areas 242 and 244 inside the cafeteria 230.

In an embodiment, the placement of the electronic display area 115 may be determined using a variety of criteria such as, for example, the type of message to be communicated, a transit path of the employee 120, an eye-level of the employee 120, the line-of-sight vision of the employee 120, the peripheral vision of the employee 120, and/or a variety of other criteria known in the art. The transit path of the employee 120 may include, for example, a path traveled by the employee 120. The eye-level of the employee 120 may be, for example, a distance between the floor and the eyes of the employee 120. In an embodiment, the placement of the electronic display area 115 may indicate to the employee 120 the type of message that is displayed on the electronic display area 115. For example, a vertically oriented placement of the electronic display area 115 may indicate to the employee 120 that the type of message displayed by the electronic display area 115 is related to the business culture of the employer 110 and/or the employee 120, while a horizontally oriented placement of the electronic display area 115 may indicate to the employee 120 that the type of message displayed by the electronic display area 115 is related to the product of the employer 110.

Referring now to FIGS. 1A, 1B, 1C, 2A and 2C, an embodiment of the placement of the electronic display area 115 in a room 250 is illustrated. The placement of the electronic display area 115 illustrated in FIG. 2C includes a perpendicular orientation of the electronic display area 115 to a line-of-sight 252 of the employee 120, a horizontal orientation of the electronic display area 115, and the electronic display area 115 being mounted to a wall of the room 250. Additionally, in the illustrated embodiment, the employee 120 is in transit and moving in a direction A. In an embodiment, the electronic display area 115 may be mounted to a stationary or adjustable apparatus that extends from the wall.

Referring now to FIGS. 1A, 1B, 1C, 2A and 2D, an alternative embodiment of the placement of the electronic display area 115 in a hallway 256 is illustrated. The placement of the electronic display area 115 illustrated in FIG. 2D includes the electronic display area 115 being oriented such that it is in the peripheral vision of the employee 120, a horizontal orientation of the electronic display area 115, and the electronic display area 115 being mounted to a wall of the hallway 256. Additionally, in the illustrated embodiment, the employee 120 is in transit and moving in a direction B.

Referring now to FIGS. 1A, 1B, 1C, 2A and 2E, an alternative embodiment of the placement of the electronic display area 115 in a hallway 260 is illustrated. The placement of the electronic display area 115 illustrated in FIG. 2E includes being oriented such that it is in the peripheral vision of the employee 120, a vertical orientation of the electronic display area 115, and being mounted to a wall of the hallway 260. Additionally, in the illustrated embodiment, the employee 120 is in transit and moving in a direction C.

Referring now to FIGS. 1A, 1B, 1C, 2A and 2F, an embodiment of the placements of the electronic display areas 115 and 117 in a hallway intersection 270 is illustrated. The placements of the electronic display areas 115 and 117 illustrated in FIG. 2F include non-perpendicular orientation of the electronic display area 115 to the line-of-sights 272 and 274 of the employees 120 and 122, respectively. The electronic display areas 115 and 117 are mounted to opposing walls of the hallway intersection 270. Additionally, in the illustrated embodiment, the employee 120 is in transit and moving in a direction E, and the employee 122 is in transit and moving in a direction F. In an embodiment, the electronic display areas 115 and 117 may be mounted to a floor or a ceiling of the hallway intersection 270. In an alternative embodiment, the electronic display areas 115 and 117 may be mounted to a stationary or adjustable apparatus which extends from the floor or the ceiling.

Referring now to FIGS. 1A, 1B, 1C, 2A and 2G, an alternative embodiment of the placements of the electronic display areas 115 and 117 in a hallway intersection 280 is illustrated. The placements of the electronic display areas 115 and 117 illustrated in FIG. 2G include non-perpendicular orientations of the electronic display areas 115 and 117 to the line-of sights 282 and 284 of the employees 120 and 122, respectively. In an embodiment, the electronic display areas 115 and 117 are mounted to a floor of the hallway intersection 280 and are coupled to each other. In an embodiment, the electronic display areas 115 and 117 are mounted to a ceiling of the hallway intersection 280 and are coupled to each other. Additionally, in the illustrated embodiment, the employee 120 is in transit and moving in a direction G, and the employee 122 is in transit and moving in a direction H. In an alternative embodiment, one multi-sided electronic display area 115 which is visible from a plurality of angles may be provided in place of the electronic display areas 115 and 117.

Referring now to FIGS. 1A, 1B, 1C, 2A and 2H, an alternative embodiment of the placement of the electronic display area 115 in a room 286 is illustrated. The placement illustrated in FIG. 2H includes a non-perpendicular orientation of the electronic display area 115 to the line-of-sight 288 of the employee 120 and the electronic display area 115 being mounted to a ceiling of the room 286. Additionally, in the illustrated embodiment, the employee 120 is in transit and moving in a direction I.

Referring now to FIGS. 1A, 1B, 1C, 2A, 2I and 2J, the method 200 proceeds to block 204 where an action graphic of the message is displayed on the electronic display area 115 for a period of time between two and five seconds. In an embodiment, the display area communication engine 150 receives the action graphic from the message engine and the display area information relating to the electronic display area 115 from the display area database. The action graphic may be, for example, part of the message information. The action graphic may include, for example, an animated display of graphics and/or text intended to capture the attention and/or interest of the employee 120. The action graphic may originate from, for example, the employer 110, the content manager, a provider other than the employer 110, and/or a variety of other entities known in the art. In an embodiment, the action graphic may include a displayed sequence of images 292 and 294, illustrated in FIGS. 2I and 2J respectively. In the illustrated embodiment, the action graphic includes a plurality of images that depict money falling. However, in alternative embodiments, one of skill in the art will recognize that the action graphic may include a variety of content and may additionally include the use of, for example, simple animation, complex animation, simple graphics, complex graphics, fluid animation, colors, a plurality of images, text, audio, and/or a variety of other techniques known in the art.

Referring now to FIGS. 1A, 1B, 1C, 2A and 2K, the method 200 proceeds to block 206 where a statement of the message is displayed on the electronic display area 115 for a period of time between eight and twelve seconds. The statement may include, for example, the content of the message that the employer 110 desires to communicate to the employee 120. In an embodiment, the statement may include an action step that may inform the employee 120 of an action that the employee might perform. The action may include the employee 120, for example, calling a phone number, visiting a Web site, visiting an office, contacting an individual, and/or a variety of other actions known in the art. In an embodiment, the action step may always be displayed in a specific region of the electronic display area 115 such as, for example, a lower region (e.g., an area at the bottom of the electronic display area 115), to provide a consistent interface across a plurality of messages. The statement may originate from, for example, the employer 110, the content manager, a provider other than the employer 110, and/or a variety of other entities known in the art. In an embodiment, the statement may include image 296, illustrated in FIG. 2K, having an action step 298. For clarity, the statement in the illustrated embodiment includes a simple image and text. However, in alternative embodiments, one of skill in the art will recognize that the statement may include simple images, complex images, simple graphics, complex graphics, text, colors, animation, audio, and/or a variety of other techniques known in the art. In an embodiment, the statement includes between 12 and 15 words.

The method 200 then proceeds to decision block 208 where it is determined if an additional message will be displayed. If at decision block 208 it is determined that an additional message will be displayed, the method 200 then proceeds to block 204, where an additional action graphic is displayed, similar to as described above. If at decision block 208 it is determined that an additional message will not be displayed, the method 200 ends at block 210.

Figure 3A:
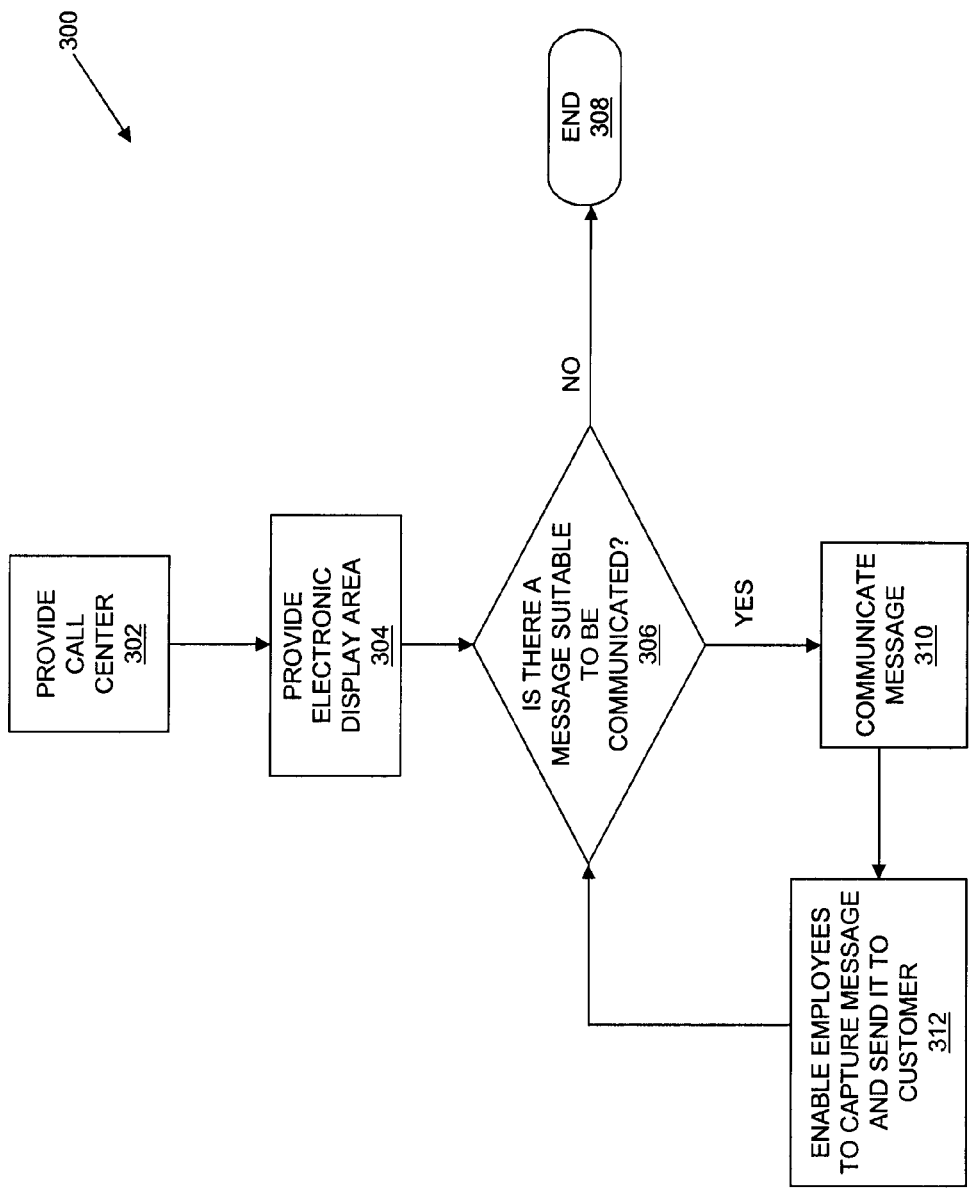
FIG. 3A is a flow chart illustrating an embodiment of a method to communicate information to an employee.
Figure 3B:
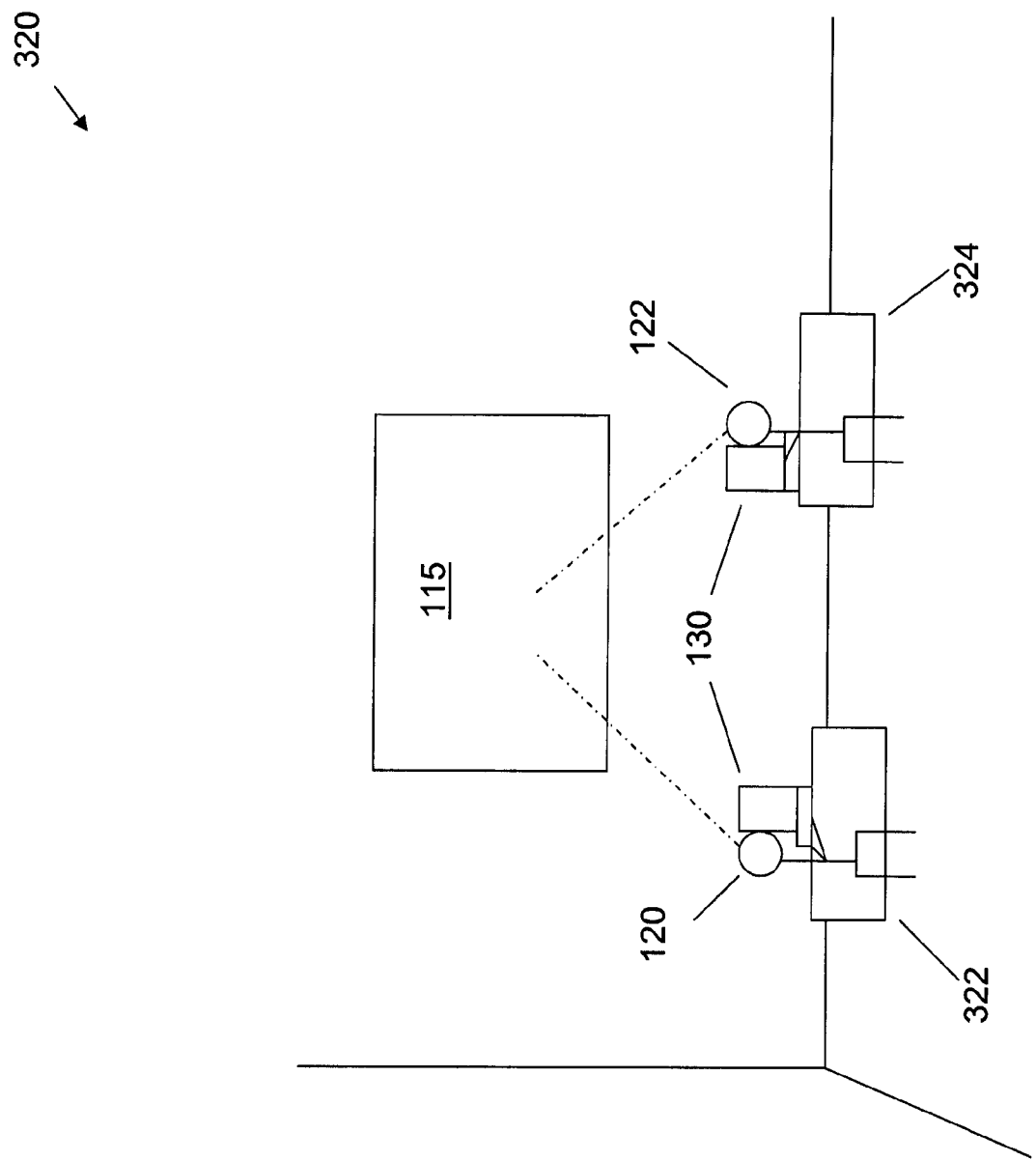
FIG. 3B is a perspective view illustrating an embodiment of a call center used in the method of FIG. 3A.
Figure 3C:
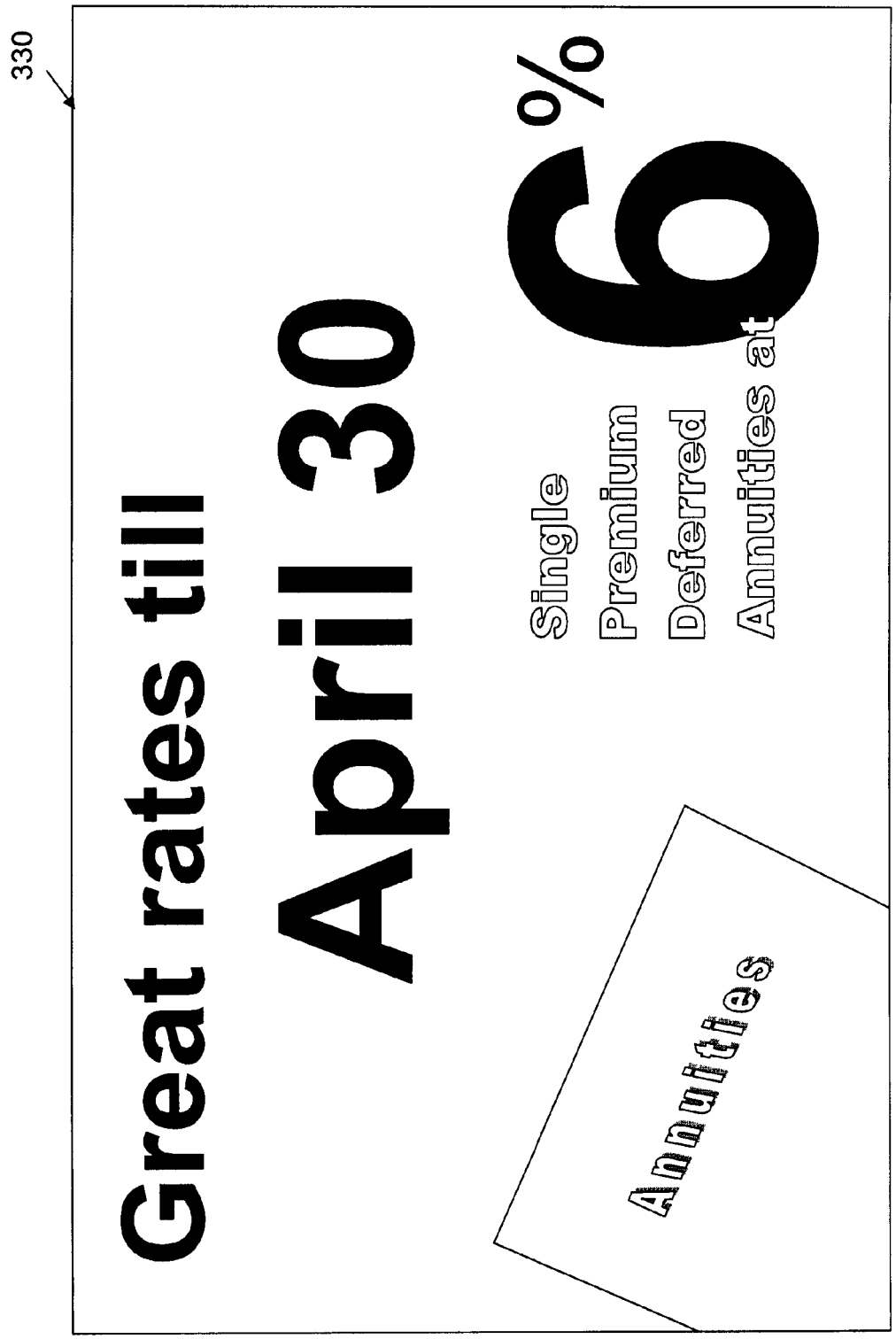
FIG. 3C is a display shot illustrating an embodiment of a message used in the method of FIG. 3A.
Figure 4A:
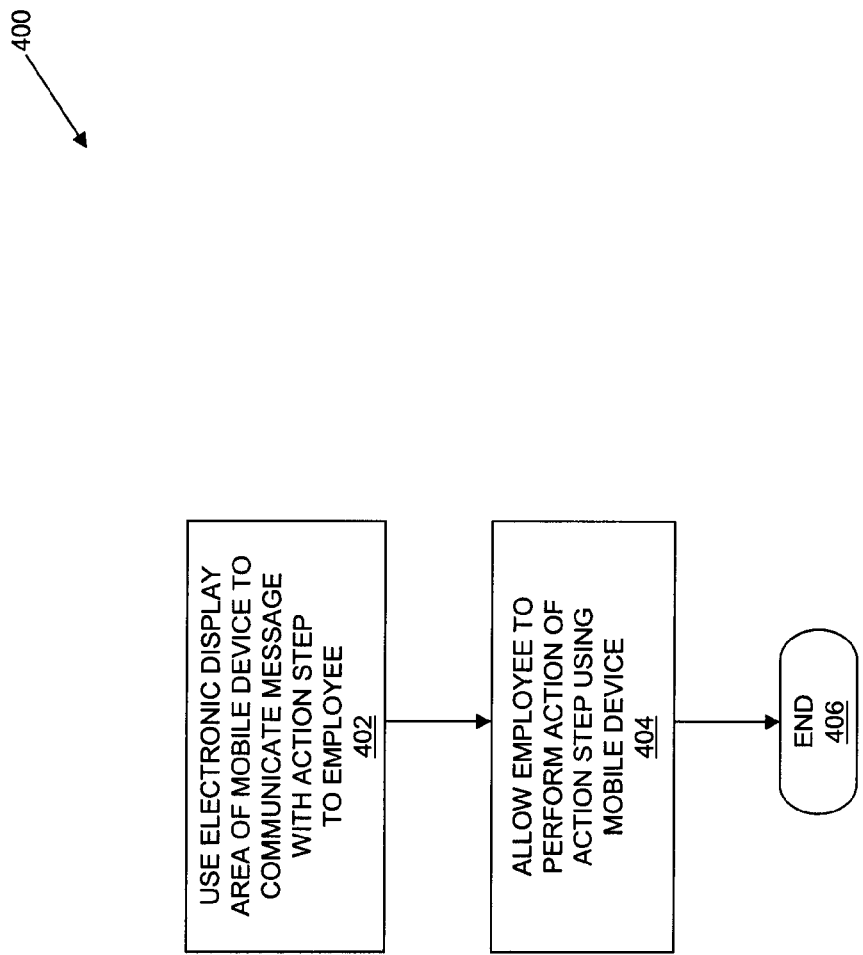
FIG. 4A is a flow chart illustrating an embodiment of a method to communicate information to an employee.
Figure 4B:
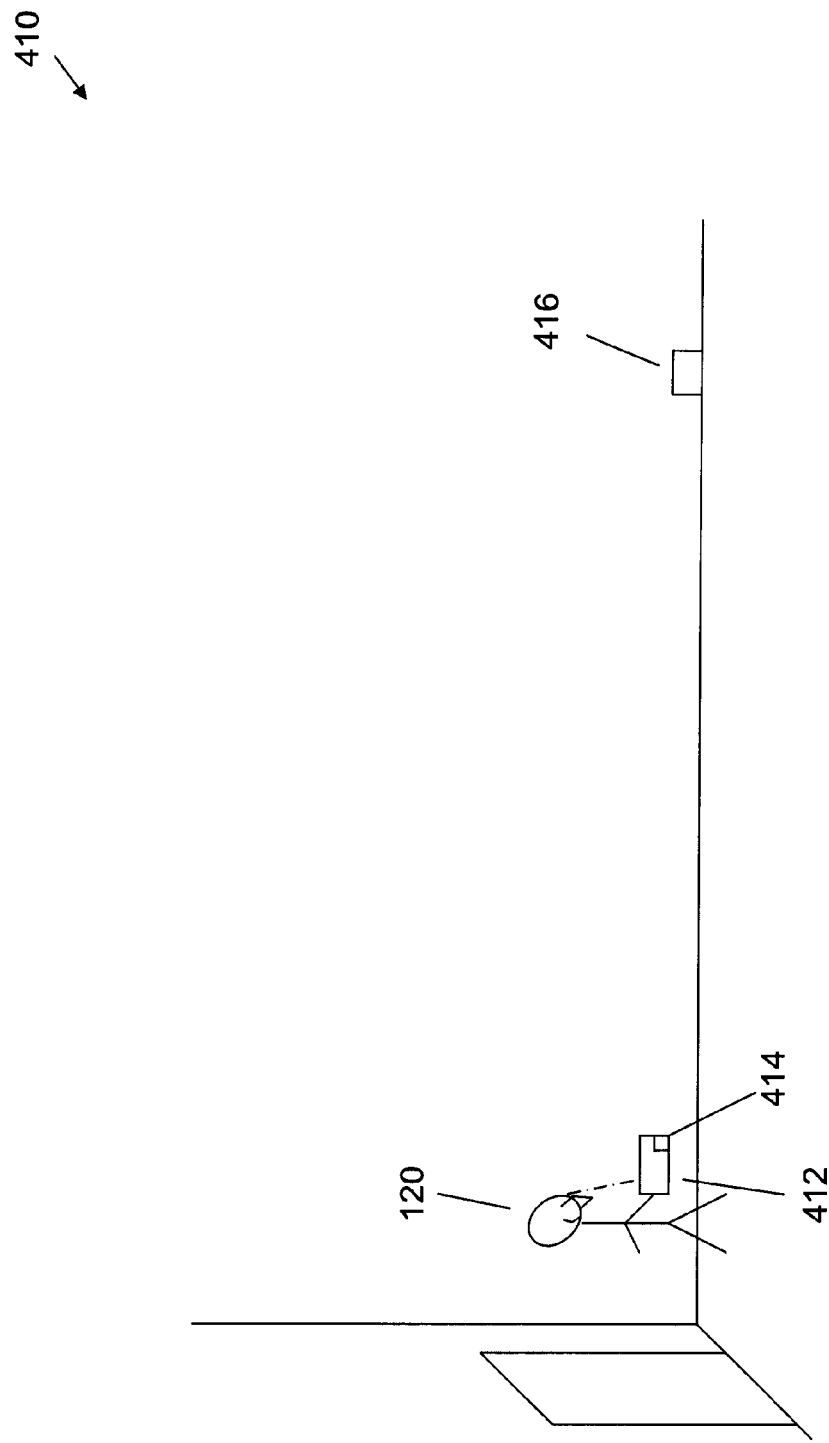
FIG. 4B is a perspective view illustrating an embodiment of a message used in the method of FIG. 4A.
Figure 4C:
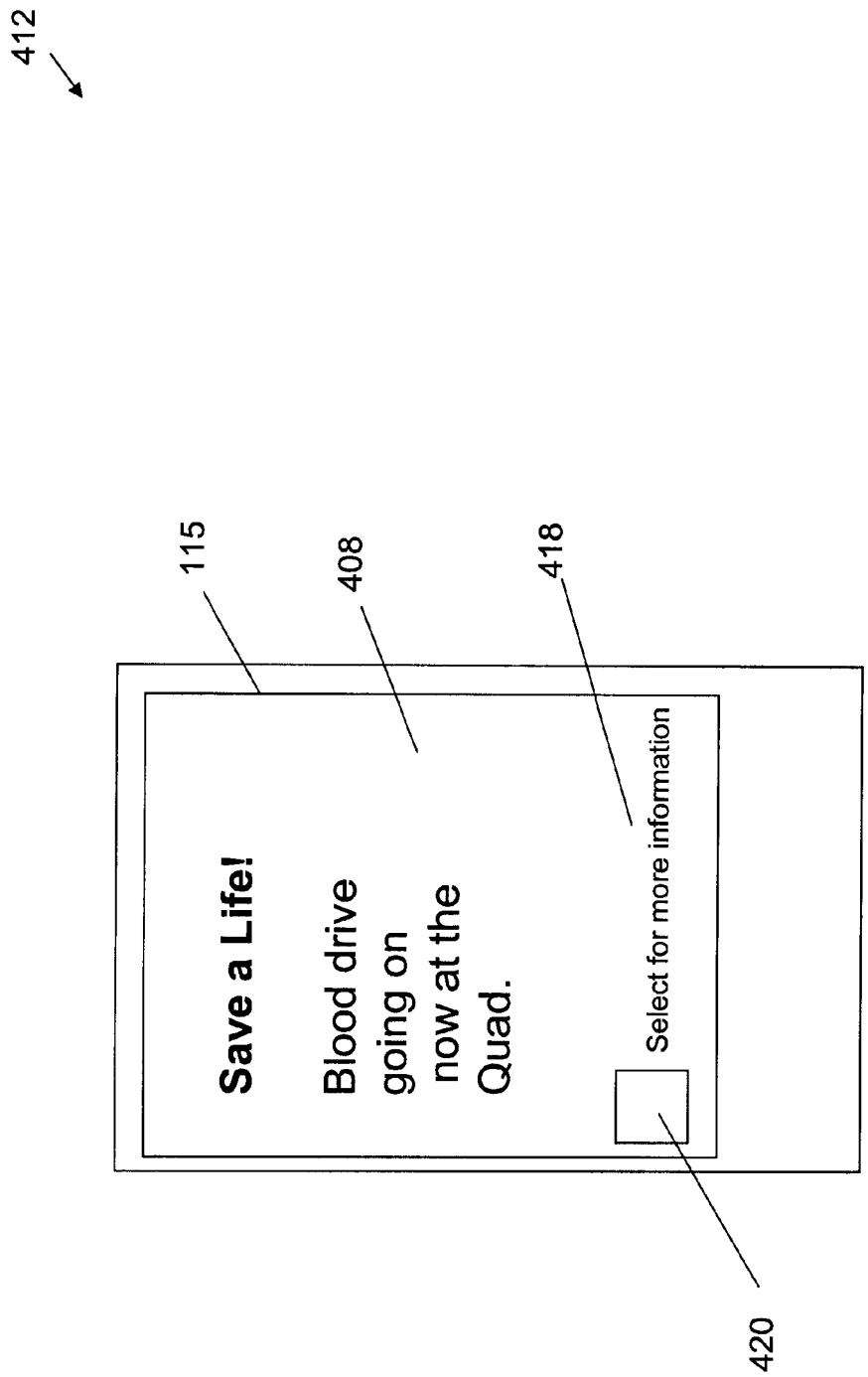
FIG. 4C is a front view illustrating an embodiment of a mobile device used in the method of FIG. 4A.

Referring now to FIGS. 1A, 1B, 1C, 3A and 3B, an embodiment of a method 300 to communicate information to an employee is illustrated. The method 300 begins at block 302, where the employer 110 provides a call center 320. The call center 320 includes a plurality of employee stations 322 and 324. Each of the employee stations 322 and 324 may include, for example, the employee 120 and/or the employee 122, a desk, a chair, a telephone, the IHS 130 connected to the network 105, and/or a variety of other employee station items known in the art. The call center 320 may be, for example, a place where the employees 120 and 122 initiate phone calls to and/or receive phone calls from the customer 125. In an embodiment, the call center 320 is provided by a provider other than the employer 110. In an embodiment, the employees 120 and 122 may communicate with the customer 125 using, for example, e-mail (e.g., over the network 105), postal mail, in-person communication, and/or a variety of other forms of communication known in the art. In an embodiment, the employees 120 and 122 may communicate with the customer 125 about matters relating to the product offered by the employer 110. In an embodiment, the employees 120 and 122 may be communicating with the customer 125 on behalf of the employer 110, a provider other than the employer 110, and/or a variety of other entities known in the art. In an embodiment, the customer 125 may include a current purchaser of the product of the employer 110, a previous purchaser of the product of the employer 110, a potential purchaser of the product of the employer 110, a supplier of the product of the employer 110, an additional employee of the employer 110, and/or a variety of other customer relationships known in the art. For clarity, FIG. 3B illustrates two employee stations 322 and 324 and two employees 120 and 122. However, one of skill in the art will recognize that any number of employee stations and/or employees are within the scope of the present embodiment.

The method 300 then proceeds to block 304 where the employer 110 provides the electronic display area 115, wherein the electronic display area 115 is viewable from the employee stations 322 and 324. In an embodiment, the electronic display area 115 is provided by an entity other than the employer 110 such as, for example, a provider other than the employer 110, a third party, and/or a variety of other entities known in the art. For clarity, FIG. 3B illustrates the placement of the electronic display area 115 including a non-perpendicular orientation of the electronic display area 115 to the line-of-sight of the employees 120 and 122, a horizontal orientation of the electronic display area 115, and the electronic display area 115 being mounted to the wall. However, one of skill in the art will recognize that a variety of placements may be applicable to the present embodiment such as, for example, perpendicular orientation of the electronic display area 115 to the line-of-sight of the employee 120 and/or the employee 122, orientation of the electronic display area 115 such that it is in the peripheral vision of the employee 120 and/or the employee 122, vertical orientation of the electronic display area 115, mounting the electronic display area 115 to the ceiling, the floor, an apparatus that is mounted to the floor, an apparatus that is mounted to the ceiling, an apparatus that is mounted to the wall, and/or a variety of other placements known in the art.

The method 300 then proceeds to decision block 306 where it is determined whether or not there is a message suitable to be communicated to the employees 120 and 122 using the electronic display area 115. In an embodiment, if the employer 110 desires to provide education about the product of the employer 110, the message may be considered suitable to be communicated if the message includes the product information, described above. In an embodiment, the content manager may determine whether the message is suitable to be communicated. If at decision block 306 it is determined that there is not a message suitable to be communicated to the employees 120 and 122 using the electronic display area 115, the method 300 ends at block 308.

Referring now to FIGS. 1A, 1B, 1C, 3A, 3B and 3C, if at decision block 306 it is determined that there is a message suitable to be communicated using the electronic display area 115, the method 300 then proceeds to block 310 where the message is communicated to the employees 120 and 122 using the electronic display area 115. In an embodiment, the message may include the product information. For example, in the illustrated embodiment of FIG. 3C, a message 330 includes product information (e.g., great annuity rates) about a product (i.e., annuities). In an embodiment, the message may be communicated to the employees 120 and 122 with directions that the employees 120 and 122 communicate messages on the electronic display area 115 to the customer 125.

The method 300 then proceeds to block 312 where the employees 120 and 122 are enabled to capture the message and send it to the customer 125. In an embodiment, the IHS 130 of the employee station 320 may include software that receives the message from the electronic display area 115 over the network 105. In an embodiment, the software may then enable the employee 120 to capture the message by prompting the employee 120 whether the employee 120 desires to capture the message. In an embodiment, if the employee 120 desires to capture the message, the software may save the message on, for example, the computer-readable medium 140 or the memory device 144. In an embodiment, the software may then enable the employee 120 to send the message to the customer 125 using, for example, e-mail, file transfer, postal mail, and/or a variety of other communication methods known in the art. In an alternative embodiment, the employee 120 may send the message to the customer 125 by communicating the content of the message to the customer 125 using, for example, telephone communication, in-person communication, and/or e-mail.

In an embodiment, the employee 120 may send the message to the customer 125, for example, every time the employee 120 communicates with the customer 125, or, for example, when the employee 120 and the customer 125 are discussing a matter directly or tangentially related to the content of the message, in order to help the employee 120 provide better service and/or sell additional products of the employer 110. The communication may be directly related to the content of the message, for example, when the customer 125 is asking about an automobile loan and the content of the message includes information about an automobile loan such as, for example, a current rate of the automobile loan. The communication may be tangentially related to the content of the message, for example, when the customer is asking about an automobile loan and the content of the message includes information about automobile insurance. The method 300 then returns to decision block 306, where the method 300 proceeds as described above.

Referring now to FIGS. 1A, 1B, 1C, 4A, 4B and 4C, an embodiment of a method 400 to communicate information to an employee is illustrated. The method 400 begins at block 402 where the electronic display area 115 of a mobile device is used to communicate a message 408 to the employee 120 in an employment area. In an embodiment, the employment area is a room 410 or other location where the employee 120 may be performing work for the employer 110. In an embodiment, the employee 120 may be traveling through the room 410 on the way to another location. The mobile device may include, for example, an IHS such as the IHS 130, and may be connected to the network 105. In an embodiment, the mobile device 412 may be, for example, a PDA (i.e., personal digital assistant), a mobile phone, a computer, a laptop computer, a handheld computer, and/or a variety of other mobile devices known in the art. The message 408 may include, for example, a Web page, an e-mail, an instant message, a pop-up window, a calendar reminder, text, a screen saver, an audio message, and/or a variety of other message forms known in the art.

In an embodiment, the mobile device 412 is configured to receive and display the message 408 instead of or after going into a time-out mode. The time-out mode may be, for example, a mode entered by the mobile device 412 after a certain period of time without receiving input from the employee 120. The time-out mode may include, for example, displaying a saver graphic, entering a suspend state, entering a hibernation state, entering a blank display state, entering a low-power state, entering a powered off state, and/or a variety of other time-out mode methods known in the art. In an embodiment, after a certain period of time without receiving input from the employee 120, instead of entering a low-power state, the mobile device 412 may be operable to display the message 408.

In an embodiment, the mobile device 412 may include a tracking device 414, and the employment area may include a sensor 416 for tracking the tracking device 414. In an embodiment, the tracking device 414 and the sensor 416 may be used to ascertain a geographical location of the mobile device 412 so that the employer 110 may, for example, provide a message that is tailored to the geographical location of the employee 120. The content of the tailored message may be, for example, related to the geographical location of the mobile device 412. For example, in the illustrated embodiment of FIG. 4C, the message 408 displayed on the electronic display area 115 includes a description of a blood drive occurring at a specific location (e.g., "the Quad"). The employer 110 may, for example, provide the message 408 to the electronic display area 115 of the mobile device 412 when the mobile device 412 is within a certain range of the specific location and/or the sensor 416 such as, for example, within 100 feet of the specific location and/or the sensor 416. In an embodiment, the message may include a map from the location of the tracking device 414 to a location of an event in the employment area.

In an embodiment, the employee 120 does not make a specific request for the message 408 to be sent to the mobile device 412. For example, the message 408 may be displayed on the electronic display area 115 of the mobile device 412 without the employee 120 having requested the display of a message, because of the mobile device 412 being within the range of the sensor 416. In an embodiment, an originator of the message 408 does not make a specific request that the employee 120 be a recipient of the message on the mobile device 412. For example, the originator may have, for example, designated that the message 408 be displayed to all employees within the range of the sensor 416. In an embodiment, the originator of the message 408 is the content manager.

The method 400 then proceeds to block 404, where the employee 120 is allowed to perform an action described in an action step 418 of the message 408 using the mobile device 412. The action step 418 may, for example, be part of the message 408, and may, for example, inform the employee 120 of the action that the employee 120 might perform. In an embodiment, the action may be performed by the employee 120 using the mobile device 412. For example, in the illustrated embodiment of FIG. 4C, the action step 418 describes the action of selecting a link 420 on the electronic display area 115 of the mobile device 412 to receive more information. In an embodiment, selecting the link 420 may include, for example, using a stylus, a finger, a mouse, a keyboard, a trackball, a light pen, and/or a variety of other selection and/or input methods known in the art. In an embodiment, the action described in the action step 418 may be performed without using the mobile device 412 by, for example, placing a phone call, walking to the specific location, sending an e-mail, and/or a variety of other methods of action known in the art.

Thus, systems and methods have been described that provide techniques for an employer to efficiently communicate information to an employee using an electronic display area. Instead of reading outdated and scattered fliers, tracking down a company newsletter, and/or logging in to an intranet to find information communicated by the employer, the employee may simply view the electronic display area during the normal course of the employee's work day. The increased efficiency of the communication may result in the employer being able to communicate more information to the employee. Additionally, it may result in the employee having a more enjoyable and/or more productive working environment.

Although illustrative embodiments have been shown and described, a wide range of modification, change, and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system to communicate information to an employee, the system comprising at least one subsystem to:

provide a call center comprising a plurality of employee stations;

provide an electronic display area at the call center, wherein the electronic display area is viewable from each of the employee stations;

use the electronic display area to communicate a message to at least one employee while the employee is located in the call center, wherein the message comprises product information about a product offered by an employer of the employee and wherein using the electronic display to communicate the message includes displaying an action graphic for a period of time and a statement for a period of time and repeating the electronic communication of the message at a regular interval; and enable the employee to capture the message and send the message to a customer.

2. The system of claim 1, wherein the message includes content selected from a group consisting of real-time product information, a custom message from a content manager, information about a product offered by a provider other than the employer, calendar information, and combinations thereof.

3. The system of claim 1, wherein the product offered by the employer is selected from a group consisting of banking products, banking services, insurance products, insurance services, investment products, investment services, financial planning products, financial planning services, technical support products, technical support services, and combinations thereof.

4. The system of claim 1, further comprising at least one subsystem to:
provide an action step in the message.

5. The system of claim 1, wherein the employee uses the message to market the product to a customer.

6. The system of claim 1, further comprising at least one subsystem to:
use the electronic display area to communicate employment information to the employee, wherein the employment information is selected from the group consisting of employee information, employer information, recreational information, cultural information, human resources information, and combinations thereof.

7. The system of claim 1, further comprising at least one subsystem to:
determine that the message is suitable to be communicated using the electronic display area.

8. A non-transitory computer-readable medium comprising computer-readable instructions to communicate information to an employee, said computer-readable instructions comprising instructions to:
provide a call center comprising a plurality of employee stations;
provide an electronic display area at the call center, wherein the electronic display area is viewable from each of the employee stations;
use the electronic display area to communicate a message to at least one employee while the employee is located in the call center, wherein the message comprises product information about a product offered by an employer of the employee and wherein using the electronic display to communicate the message includes displaying an action graphic for a period of time and a statement for a period of time and repeating the electronic communication of the message at a regular interval; and
enable the employee to capture the message and send the message to a customer.

9. The non-transitory computer-readable medium of claim 8, wherein the message includes content selected from a group consisting of real-time product information, a custom message from a content manager, information about a product offered by a provider other than the employer, calendar information, and combinations thereof.

10. The non-transitory computer-readable medium of claim 8, wherein the product offered by the employer is selected from a group consisting of banking products, banking services, insurance products, insurance services, investment products, investment services, financial planning products, financial planning services, technical support products, technical support services, and combinations thereof.

11. The non-transitory computer-readable medium of claim 8, further comprising computer-readable instructions comprising instructions to:
provide an action step in the message.

12. The non-transitory computer-readable medium of claim 8, wherein the employee uses the message to market the product to a customer.

13. The non-transitory computer-readable medium of claim 8, further comprising computer-readable instructions comprising instructions to:
use the electronic display area to communicate employment information to the employee, wherein the employment information is selected from the group consisting of employee information, employer information, recreational information, cultural information, human resources information, and combinations thereof.

14. The non-transitory computer-readable medium of claim 8, further comprising computer-readable instructions comprising instructions to:
determine that the message is suitable to be communicated using the electronic display area.

15. A method to communicate information to an employee, the method comprising:
providing a call center comprising a plurality of employee stations;
providing an electronic display area at the call center, wherein the electronic display area is viewable from each of the employee stations;
using the electronic display area to communicate a message to at least one employee while the employee is located in the call center, wherein the message comprises product information about a product offered by an employer of the employee and wherein using the electronic display to communicate the message includes displaying an action graphic for a period of time and a statement for a period of time and repeating the electronic communication of the message at a regular interval; and
enabling the employee to capture the message and send the message to a customer.

16. The method of claim 15, wherein the message includes content selected from a group consisting of real-time product information, a custom message from a content manager, information about a product offered by a provider other than the employer, calendar information, and combinations thereof.

17. The method of claim 15, wherein the product offered by the employer is selected from a group consisting of banking products, banking services, insurance products, insurance services, investment products, investment services, financial planning products, financial planning services, technical support products, technical support services, and combinations thereof.

18. The method of claim 15, further comprising:
providing an action step in the message.

19. The method of claim 15, wherein the employee uses the message to market the product to a customer.

20. The method of claim 15, further comprising:
using the electronic display area to communicate employment information to the employee, wherein the employment information is selected from the group consisting of employee information, employer information, recreational information, cultural information, human resources information, and combinations thereof.

21. The method of claim 15, further comprising:
determining that the message is suitable to be communicated using the electronic display area.

* * * * *